(12) United States Patent
Smus et al.

(10) Patent No.: US 10,887,687 B2
(45) Date of Patent: Jan. 5, 2021

(54) PAIRING OF MEDIA STREAMING DEVICES

(71) Applicant: Google LLC, Mountain View, CA (US)

(72) Inventors: Boris Smus, San Francisco, CA (US); Alejandro Jose Kauffmann, San Francisco, CA (US); Jay Pierre Civelli, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/174,755

(22) Filed: Oct. 30, 2018

(65) Prior Publication Data

US 2020/0092641 A1    Mar. 19, 2020

Related U.S. Application Data

(63) Continuation of application No. 14/823,367, filed on Aug. 11, 2015, now Pat. No. 10,136,214.

(51) Int. Cl.
*H04R 3/00* (2006.01)
*H04B 1/713* (2011.01)
(Continued)

(52) U.S. Cl.
CPC ............. *H04R 3/00* (2013.01); *G06F 1/1694* (2013.01); *H04B 1/713* (2013.01);
(Continued)

(58) Field of Classification Search
CPC ............... G10L 15/22; G10L 2015/223; G10L 2015/088; G10L 15/265; G10L 15/26;
(Continued)

(56) References Cited

U.S. PATENT DOCUMENTS 8,457,557 B2 * 6/2013 Alden ................. H04L 63/0492
                                                         455/41.2
8,487,838 B2    7/2013 Lewis et al.
(Continued)

FOREIGN PATENT DOCUMENTS

WO    WO 2010124190    1/2011
WO    WO 2014113891    1/2014

OTHER PUBLICATIONS

International Preliminary Report on Patentability dated Feb. 13, 2018 in International Patent Application No. PCT/US2016/045992.
(Continued)

*Primary Examiner* — Lun-See Lao
(74) *Attorney, Agent, or Firm* — Morgan, Lewis & Bockius LLP

(57) ABSTRACT

Among other things, this document describes a computer-implemented method. The method can include receiving, at a first device, an indication of user input to cause the first device to establish a wireless data connection with another device. A determination can be made at the first device that one or more sensors on the first device are oriented toward a second device. In response to at least one of (i) receiving the indication of user input to cause the first device to establish a wireless data connection with another device and (ii) determining that the one or more sensors on the first device are oriented toward the second device, a first wireless data connection can be established between the first device and the second device. A first stream of audio data can be received and played at the first device.

20 Claims, 12 Drawing Sheets

US 10,887,687 B2
Page 2

(51) Int. Cl.

| | | |
|---|---|---|
| *H04W 76/15* | (2018.01) | |
| *H04W 4/80* | (2018.01) | |
| *G06F 1/16* | (2006.01) | |
| *H04M 1/725* | (2006.01) | |
| *H04L 29/06* | (2006.01) | |
| *H04W 76/14* | (2018.01) | |
| *H04W 8/00* | (2009.01) | |
| *H04W 84/18* | (2009.01) | |

(52) U.S. Cl.
CPC ........ *H04L 65/1069* (2013.01); *H04L 65/607* (2013.01); *H04M 1/7253* (2013.01); *H04W 4/80* (2018.02); *H04W 76/15* (2018.02); *H04B 2201/71346* (2013.01); *H04M 1/72569* (2013.01); *H04M 2250/02* (2013.01); *H04R 2420/01* (2013.01); *H04R 2420/07* (2013.01); *H04W 8/005* (2013.01); *H04W 76/14* (2018.02); *H04W 84/18* (2013.01)

(58) Field of Classification Search
CPC ........... G10L 15/30; G10L 2021/02166; G10L 25/78; G10L 15/02; G10L 15/08; G10L 15/00; G10L 15/20; G10L 17/005; G10L 17/18; G10L 17/22; G10L 2025/783; G10L 21/0208; G10L 21/0216; G10L 25/03; G10L 25/30; G10L 25/51; G10L 25/63; G10L 25/84; G10L 25/87; G10L 13/00; G10L 13/043; G10L 15/063; G10L 15/16; G10L 15/1807; G10L 15/1822; G10L 15/183; G10L 15/24; G10L 17/00; G10L 17/02; G10L 17/04; G10L 17/06; G10L 17/08; G10L 17/24; G10L 2015/0638; G10L 2015/227; G10L 2015/228; G10L 2021/02161; G10L 2021/02165; G10L 21/0272; G10L 21/028; G10L 21/0316; G10L 25/21; G10L 25/24; G10L 25/48; G10L 25/57; G10L 25/60; G10L 25/69; G10L 25/93; H04R 2420/07; H04R 3/005; H04R 1/406; H04R 25/554; H04R 2430/01; H04R 3/04; H04R 3/12; H04R 1/1083; H04R 2225/55; H04R 2420/01; H04R 25/405; H04R 25/407; H04R 29/001; H04R 3/00; H04R 1/04; H04R 1/08; H04R 1/1008; H04R 1/1041; H04R 2201/107; H04R 2201/401; H04R 2205/024; H04R 2227/003; H04R 2227/005; H04R 2430/03; H04R 2499/11; H04R 25/505; H04R 25/552; H04R 25/558; H04R 25/70; H04R 27/00; H04R 29/002; H04R 5/02; H04R 1/025; H04R 1/028; H04R 1/1016; H04R 1/1091; H04R 1/20; H04R 2201/403; H04R 2203/12; H04R 2225/021; H04R 2225/025; H04R 2227/009; H04R 2430/00; H04R 2430/20; H04R 2430/23; H04R 2430/25; H04R 2460/07; H04R 25/40; H04R 25/402; H04R 25/43; H04R 25/602; H04R 25/604; H04R 29/005; H04R 5/04
USPC .................................. 381/74, 17–22, 1, 312
See application file for complete search history.

(56) References Cited

U.S. PATENT DOCUMENTS

| | | | | |
|---|---|---|---|---|
| 10,057,679 | B2* | 8/2018 | Fish | H04R 3/005 |
| 10,136,214 | B2* | 11/2018 | Smus | H04B 1/713 |
| 2006/0199538 | A1 | 9/2006 | Eisenbach | |
| 2008/0090524 | A1* | 4/2008 | Lee | H04W 84/20 |
| | | | | 455/41.2 |
| 2011/0091055 | A1* | 4/2011 | LeBlanc | H04S 7/301 |
| | | | | 381/303 |
| 2013/0041648 | A1* | 2/2013 | Osman | H04S 7/302 |
| | | | | 704/2 |
| 2013/0094866 | A1* | 4/2013 | Pasquero | H04M 1/6066 |
| | | | | 398/202 |
| 2013/0095886 | A1 | 4/2013 | Hong et al. | |
| 2013/0135198 | A1 | 5/2013 | Hodge et al. | |
| 2013/0170647 | A1 | 7/2013 | Reilly et al. | |
| 2014/0152538 | A1 | 6/2014 | Ham et al. | |
| 2015/0003653 | A1* | 1/2015 | Recker | H04R 25/505 |
| | | | | 381/315 |
| 2019/0342659 | A1* | 11/2019 | Lau | H04R 3/00 |

OTHER PUBLICATIONS

International Search Report & Written Opinion dated Jan. 19, 2017 in International Patent Application No. PCT/US2016/045992.
Lee et al., "A Comparative Study of Wireless Protocols: Bluetooth, UWB, ZigBee, and Wi-Fi", in Proceedings of the 33rd Annual Conference of the IEEE Industrial Electronics Society (IECON), Taipei, Taiwan, CN, Nov. 5-8, 2007, pp. 46-51.
Manabe, H. and Fukumoto, M., "Full-time Wearable Headphone-Type Gaze Detector", in Proceedings of CHI '06 Extended Abstracts on Human Factors in Computing Systems, Montreal, Ontario, CA, Apr. 22-27, 2006, pp. 1073-1078.
Manabe, H. and Fukumoto, M., "Tap Controls for Headphones without Sensors", in Proceedings of the 24th Annual ACM Symposium on Using Interface Software and Technology, Santa Barbara, California, USA, Oct. 16-19, 2011, pp. 309-313.
Notice of Allowance dated Aug. 29, 2018 in U.S. Appl. No. 14/823,367.
Office Action dated Mar. 1, 2017 in U.S. Appl. No. 14/823,367.
Office Action dated Oct. 13, 2017 in U.S. Appl. No. 14/823,367.
Wikipedia, "Bluetooth", Wikipedia, the free encyclopedia, pp. 1-12, available at: http://www.en.wikipedia.org/wiki/Bluetooth, last accessed Aug. 10, 2015.
Wikipedia, "Sound Localization", Wikipedia, the free encyclopedia, pp. 1-11, available at: http://www.en.wikipedia.org/wiki/Sound_localization#ITD_and_ILD>, last accessed Jul. 25, 2015.
Zhang et al., "HOBS: Head Orientation-Based Selection in Physical Spaces", in Proceedings of the 2nd ACM Symposium on Spatial User Interaction, Honolulu, Hawaii, USA, Oct. 4-5, 2014, pp. 17-25.

* cited by examiner

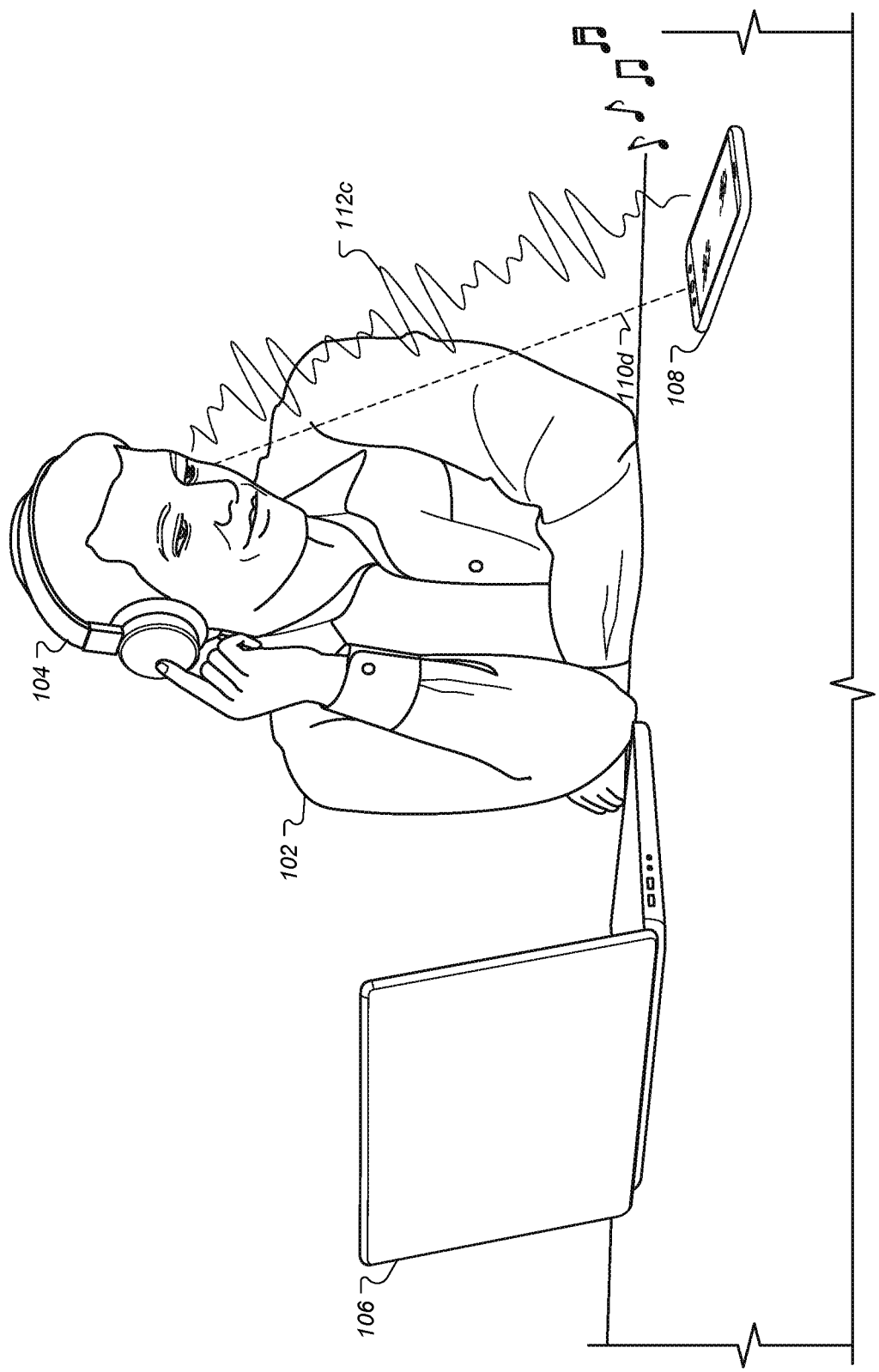

PAIRING OF MEDIA STREAMING DEVICES

CROSS-REFERENCE TO RELATED APPLICATION

This application is a continuation of U.S. patent application Ser. No. 14/823,367, filed Aug. 11, 2015, which is hereby incorporated by reference herein in its entirety.

TECHNICAL FIELD

The subject matter of this document generally relates to wireless streaming of media content, such as audio streaming.

BACKGROUND

Wireless communication protocols have been developed for streaming media content from one electronic device to another. This can be beneficial, for example, when media content is accessible through a first device, but the second device offers advantages over the first device in presenting the media content, such as having more powerful speakers for playing audio, or having a larger or higher-resolution display than the first device. For example, a user may access music from a library in a media application installed on the user's smartphone. The user may wish to play the music with greater volume or with more bass than the smartphone's speakers are capable of producing. Accordingly, a wireless communications protocol may be used to pair the smartphone with a wireless speaker, so that audio may be streamed from the smartphone to the wireless speaker for playback by the wireless speaker. In some situations, users may prefer listening to streaming music more quietly without disturbing others nearby. Rather than pairing their streaming devices (e.g., a smartphone) to a wireless loud speaker, these users may instead pair their streaming devices to wireless headphones.

SUMMARY

This document generally describes systems, methods, devices, and other techniques for pairing media-receiving devices, such as wireless headphones or wireless loud speakers, with media-streaming devices that provide the streamed content to be played by the receiving devices. In some implementations, users can easily switch connections among multiple different streaming devices by orienting the receiving device toward a target streaming device that is to be paired, and selecting a control to initiate pairing with the target streaming device.

Some implementations of the subject matter described herein include a computer-implemented method. The method can include receiving, at a first device, an indication of user input to cause the first device to establish a wireless data connection with another device. A determination can be made at the first device that one or more sensors on the first device are oriented toward a second device. In response to at least one of (i) receiving the indication of user input to cause the first device to establish a wireless data connection with another device and (ii) determining that the one or more sensors on the first device are oriented toward the second device, a first wireless data connection can be established between the first device and the second device. A first stream of audio data can be received at the first device and over the first wireless data connection from the second device, and audio encoded in the first stream of audio data can be caused to be played through one or more speakers of the first device.

These and other implementations can include one or more of the following features.

The first device can be wireless headphones, the wireless headphones including the one or more speakers and a wireless communications interface for establishing one or more wireless data connections.

Receiving the indication of user input to cause the first device to establish a wireless data connection with another device can include identifying that a control located on the headphones has been selected.

In response to establishing the first wireless data connection between the first device and the second device, at least one of visual feedback and aural feedback can be generated by the first device to indicate to a user of the first device that the first wireless data connection has been established.

Determining that the one or more sensors on the first device are oriented toward the second device can include obtaining, at the first device, an identifier for the second device. The identifier can be obtained as a result of the one or more sensors on the first device being oriented toward the second device while the second device is located in front of the one or more sensors on the first device.

Obtaining the identifier for the second device can include: (i) detecting, with the one or more sensors on the first device, a line-of-sight signal emitted by the second device, and (ii) determining, by the first device and based on information encoded in the line-of-sight signal, the identifier for the second device. The one or more sensors on the first device can be arranged to: (i) detect the line-of-sight signal when the one or more sensors are oriented toward the second device and are located within a path of the line-of-sight signal, and (ii) not detect the line-of-sight signal when the one or more sensors are oriented away from the second device or are located outside of the path of the line-of-sight signal.

The line-of-sight signal emitted by the second device can include an infrared data signal, and the one or more sensors on the first device can include one or more infrared sensors.

The first device can include (i) one or more infrared lights that comprise an infrared illuminator and (ii) an infrared camera. Determining that the one or more sensors on the first device are oriented toward the second device can include: (i) activating the one or more infrared lights to illuminate a region in front of the infrared camera of the first device; and (ii) identifying the second device from an image of at least a portion of the second device that was captured by the infrared camera while the one or more infrared lights were activated.

The image of the at least the portion of the second device can include a reflection of a retroreflective component affixed to the second device, the retroreflective component including an identifier for the second device.

The one or more sensors on the first device can include a first microphone at a first location on the first device and a second microphone at a second location on the first device, the second location being separated by a non-zero distance from the first location. Determining, at the first device, that the one or more sensors on the first device are oriented toward the second device can include: detecting, with the first microphone, an audio signal generated by the second device; detecting, with the second microphone, the audio signal generated by the second device; comparing the audio signal as detected with the first microphone and the audio signal as detected with the second microphone; and determining, based on a result of the comparing, whether the second device is located in a central region in front of the first microphone and the second microphone, such that the first microphone and the second microphone are oriented toward the second device.

The one or more sensors on the first device can include a directional microphone that is sensitive to audio emitted from a location in front of at least a portion of the first device, but that is substantially insensitive to audio emitted from locations other than the location in front of the at least the portion of the first device. Determining, at the first device, that the one or more sensors on the first device are oriented toward the second device can include detecting an audio signal, with the directional microphone, which has been emitted by the second device.

The first wireless data connection can include a BLUETOOTH connection.

An indication of second user input to cause the first device to switch to another wireless data connection with another device can be received at the first device while maintaining the first wireless data connection between the first device and the second device. A determination can be made at the first device that the one or more sensors on the first device are oriented toward a third device that is different than the second device and that is separated by a non-zero distance from the second device;

In response to (i) receiving the indication of second user input to cause the first device to switch to another wireless data connection with another device and (ii) determining that the one or more sensors on the first device are oriented toward the third device, the first device can terminate the first wireless data connection between the first device and the second device, and can establish a second wireless data connection between the first device and the third device. A second stream of audio data can be received at the first device and over the second stream of audio data from the third device, and audio encoded in the second stream of audio data can be caused to be played through the one or more speakers of the first device.

The first device can be wireless headphones and the one or more speakers can include a left speaker and a right speaker. A determination can be made that the one or more sensors on the first device are oriented toward the third device, in distinction from the second device, as a result of a user wearing the wireless headphones turning a head of the user to face the third device.

The second device and the third device can each be selected from among one of a smartphone, a tablet computer, a notebook computer, a smartwatch, a gaming console, a desktop computer, and a streaming music console.

A second wireless data connection can be established between the first device and a third device other than the second device. The second wireless data connection can be established while maintaining the first wireless data connection between the first device and the second device and in response to (i) receiving an indication of second user input, of a different type than the user input, to cause the first device to establish a concurrent wireless data connection with an additional device and (ii) determining that the one or more sensors on the first device are oriented toward the third device, a second wireless data connection between the first device and a third device other than the second device. Audio encoded in a second stream of audio data received at the first device over the second wireless data connection from the third device can be caused to be played through the one or more speakers of the first device concurrently with the audio encoded in the first stream of audio data being played through the one or more speakers.

Some implementations of the subject matter described herein can include one or more computer-readable storage devices, which may be non-transitory, and which may have instructions stored thereon that, when executed by one or more processors, cause performance of operations. The operations can include receiving, at a first device, an indication of user input to cause the first device to establish a wireless data connection with another device; determining, at the first device, that one or more sensors on the first device are oriented toward a second device; in response to (i) receiving the indication of user input to cause the first device to establish a wireless data connection with another device and (ii) determining that the one or more sensors on the first device are oriented toward the second device, establishing a first wireless data connection between the first device and the second device; receiving, at the first device and over the first wireless data connection from the second device, a first stream of audio data; and causing audio encoded in the first stream of audio data to be played through one or more speakers of the first device.

Some implementations of the subject matter described herein can include a wireless headphones device, or other media device that receives streamed content. The device can include one or more computers, one or more speakers (or a display or other content presentation devices), a pairing control, a pairing module on the one or more computers, a communications interface, and means for determining whether at least a portion of the wireless headphones device is oriented toward a second device. The pairing control can be provided on a body of the wireless headphones device at a location that is user accessible. The communications interface can be configured to establish a wireless data connection for receiving audio data at the wireless headphones device that is streamed from the second device, the interface further configured to establish the wireless data connection in response to one or both of (i) identifying that the user input has selected the pairing control and (ii) determining that the at least the portion of the wireless headphones device is oriented toward the second device.

Some implementations of the subject matter described herein can provide none, one, or more of the following advantages. A user who wishes to pair wireless headphones, or another wireless receiving device that plays streamed media content, may quickly and easily identify a target streaming device that he or she would like the headphones to pair with to receive streamed media content. Rather than scrolling through a list of detected streaming devices within range of the headphones, the user may simply turn his or her head to orient a front of the headphones at a target streaming device of the user's choice. After confirming an intent to initiate pairing, the headphones and target streaming device may automatically pair with each other. Moreover, these techniques can be extended to allow a user to readily switch between multiple different streaming devices. For example, a user may carry multiple different personal devices that stream audio or other media content, such as wearable devices, a notebook computer, a tablet computer, and a smartphone. Particular ones of these devices may be located near each other while the user is working. To switch between audio streams from different ones of these devices, the user may tap a control on the headphones, for example, to initiate pairing with a particular device that is located in front of the headphones.

BRIEF DESCRIPTION OF THE DRAWINGS

FIGS. 1A-1E depict an example scenario of a user working on a notebook computer while wearing wireless headphones. The user performs various actions in a sequence of events represented respectively by each of the FIGS. 1A-1E to control whether an audio stream is received at the headphones from the notebook computer, from a proximately located smartphone, or from both devices.

Like reference numbers among the drawings indicate like elements.

DETAILED DESCRIPTION

Figure 1A:
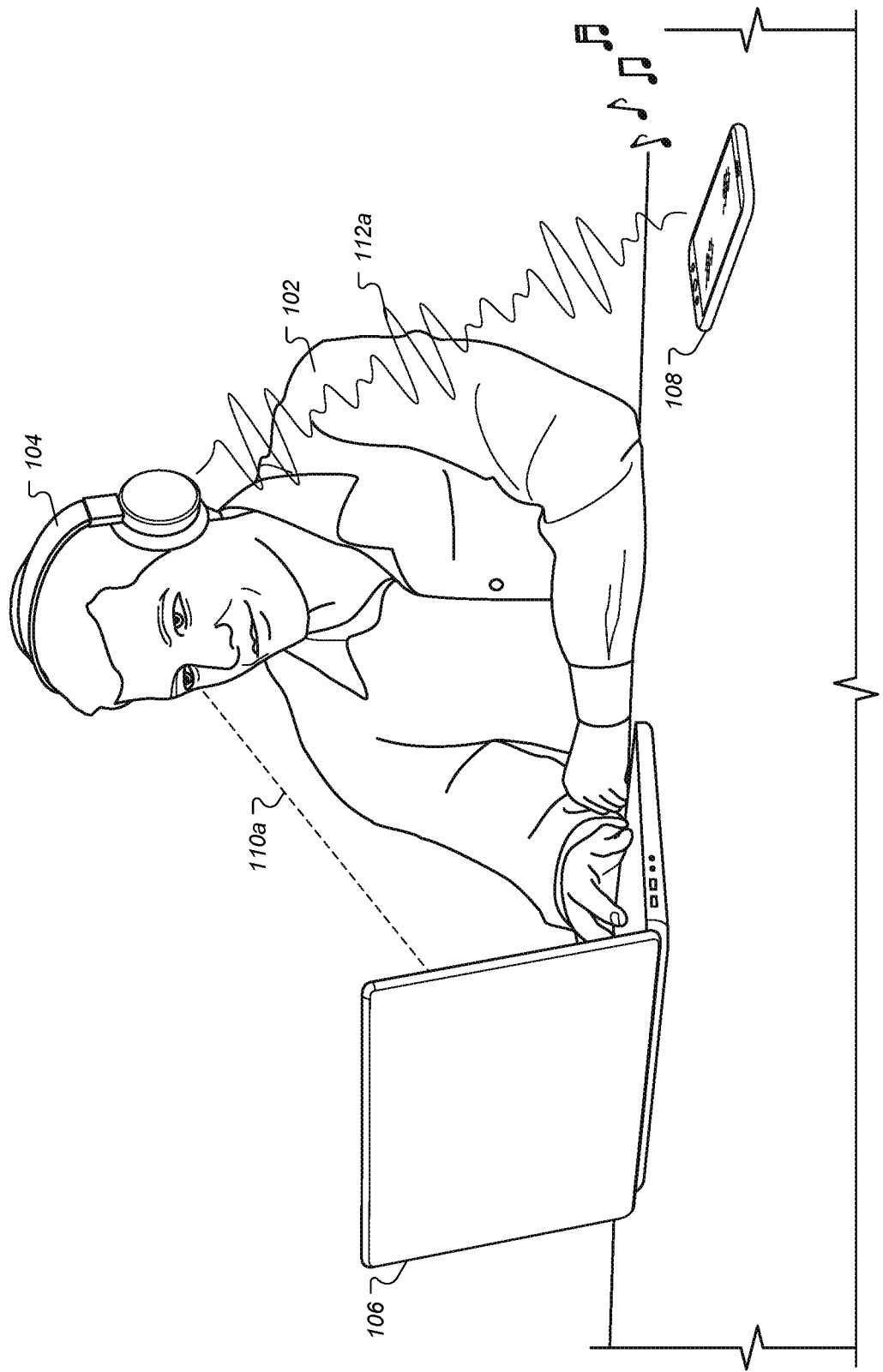

This document generally describes methods, systems, devices, and other techniques for establishing connections with audio-streaming devices. In some implementations, the techniques described herein can be implemented with wireless headphones that play audio streams wirelessly transmitted from audio-streaming devices, such as smartphones, tablets, portable media players, or notebook computers. Before an audio stream can be played from wireless headphones, a wireless data connection generally must be established between the headphones and an audio-streaming device from which the stream originates. The process of establishing such a connection is sometimes referred to as "pairing." For example, wireless headphones paired with a smartphone may play music or other audio streamed over a short-range wireless connection from the smartphone. This document describes various techniques by which users may readily pair wireless headphones or other audio-receiving devices with one or more audio-streaming devices.

In some implementations, wireless headphones may be paired with a streaming device based on a set of actions taken by a user wearing the headphones. The user actions can include a first action indicating a desire to pair the headphones, and a second action to identify a target streaming device to which the user desires the headphones pair. Generally, the actions may comprise gestures that are easily performed by the user, so as to reduce the effort required to pair the headphones with a streaming device or the effort required to switch between streams that originate from different devices. For example, a user wearing a set of wireless headphones may indicate an intent to initiate pairing with a smartphone by selecting a button or other type of control on an outer surface of the headphones, and turning his or her head toward the smartphone to identify it as the streaming device with which the headphones are to be paired. The headphones, streaming device (e.g., smartphone), or both may be equipped with sensors and other components that allow the headphones to acquire identifying information (e.g., a MAC address) for the streaming device when the streaming device is located in front of the headphones. In some implementations, the headphones may be capable of acquiring the identifying information, or other requisite information for pairing, only when the streaming device is located within a relatively narrow field of view in front of the headphones. As such, a user may select a particular streaming device with which to pair, simply by looking at the particular streaming device so that the headphones are oriented to face the particular streaming device.

In some implementations, these techniques can allow a user to more naturally switch among connections with different streaming devices. In today's technological environment, people frequently interact with multiple electronic devices having wireless audio streaming capabilities. For example, consider a user who is working in a library while listening with wireless headphones to music streamed from an album on the user's smartphone. In the midst of the work, the user finds a video that he or she would like to watch on his or her notebook computer. Because it is a library and the user does not wish to disturb others, the user may choose to play the video's audio stream through the wireless headphones. To initiate a switch in audio streams from the smartphone to the notebook computer, the user may perform similar actions as he or she initially performed to pair the headphones with the smartphone. For example, the user may turn his or her head toward the notebook computer to look at the computer, and may tap a control on a side of the headphones to indicate the intent to pair with a new device. The headphones may then respond to the user's tap of the control by automatically identifying the headphones as being oriented toward the notebook computer, obtaining pairing information for the notebook computer, terminating the wireless connection with the smartphone, and establishing a new wireless connection with the notebook computer over which audio may be streamed to the headphones. When the pairing process is completed between the headphones and the notebook computer, the user may be alerted by visual or aural feedback from the headphones, notebook computer, or both. For example, a light on the headphones may blink or change colors when the new device is paired, or a short audio clip (e.g., a chime) may be played by the headphones to transition from the smartphone's audio stream to the notebook computer's audio stream.

In some implementations, the headphones may be capable of maintaining concurrent wireless connections with multiple different streaming devices. When paired with multiple streaming devices, the headphones may play a mixture of audio from each of the paired devices, or may intermittently jump between the audio streams based on audio levels of the respective streams, for example, or based on other factors. For example, a user listening to music with wireless headphones in an airport may wish to hear announcements over the airport's PA system while listening to the music, and so may initiate a simultaneous connection with a device streaming the announcements while continuing to play music from a smartphone or personal media player. The user may indicate an intent to add a paired device, rather than switch to a new device by terminating a connection with an earlier-paired device, by providing a different type of user input than a type used for switching. For example, tapping a control on the headphones with one finger may indicate an intent to switch streaming devices (including terminating connections with any currently paired devices), whereas tapping the control with two fingers may indicate an intent to create an additional pairing with a newly identified streaming device while maintaining any existing pairings with other streaming devices.

As described in further detail below with respect to the figures, various techniques may be employed that allow the headphones to determine whether the headphones are oriented in the direction of a proximately located streaming device. In some implementations, highly directional infrared communication can occur between the headphones and the streaming device, which communication is effective only when an IR emitter and one or more IR sensors on respective ones of the devices are within a line of sight of each other. In some implementations, a streaming wireless connection can be established between a media-receiving device and a media-streaming (transmitting) device automatically based on a determination that the media-receiving device has one or more sensors that are oriented toward the media-streaming device, even without receiving an explicit indication from user input that a new connection is to be established. These and other techniques are described more fully further below.

Referring now to FIGS. 1A-1E, an example scenario is depicted of a sequence of events involving a user 102 working on a notebook computer 106 while listening to streaming audio through a set of wireless headphones 104. The user 102 is working at a desk on the notebook computer 106, but also has other personal devices with him, including a smartphone 108. For convenience, the user has placed the smartphone 108 on a surface of the desk nearby the notebook computer 106. As such, the user may multi-task between activities on the notebook computer 106 and activities on the smartphone 108. For example, the user may be working in a word processor on the notebook computer 106, while periodically checking social media and sending text messages using his phone 108. The user may be working in a quiet environment, such as an office or library, and therefore chooses to listen to audio through the headphones 104, rather than through loud speakers that may disrupt others nearby the user 102. In particular, the audio playing through the headphones 104 may be streamed from the notebook computer 106, the smartphone 108, or both. For example, the user 102 may listen to streaming radio or songs in a personal music library through a media application on the notebook computer 106. However, during the course of work, the user 102 may receive a voice message on the smartphone 108 to which he wishes to listen. The systems, methods, devices, and other techniques described herein can allow the user 102 to perform simple gestures to quickly and easily switch from streaming audio from the notebook computer 106 to the smartphone 108, and to switch back again to streaming from the notebook computer 106, for example. Moreover, the user 102 may be able to switch between streaming devices without accessing a menu or list of available streaming devices within range of the headphones 104. In some implementations, the gestures for switching streaming devices can allow the user to readily move between audio-based activities on different streaming devices, without the hassle of manually selecting a particular device for the headphones to pair through a menu or other list of devices to which the headphones may be able to pair.

Starting at FIG. 1A, the user 102 is shown wearing headphones 104 while working on the notebook computer 106. The dashed line 110a running between the face of the user 102 and the notebook computer 106 indicates that the user's gaze is directed toward the notebook computer 106. An audio stream 112a currently being played through the headphones 104 is not being streamed from the notebook computer 106, however, but is instead being streamed from the smartphone 108. The smartphone 108 is co-located on the desk with the notebook computer 106, but is separated from the computer 106 by a distance (e.g., 2-3 feet). In some implementations, the smartphone 108 may be paired with the headphones 104 through a BLUETOOTH connection, an 802.11 WI-FI connection, or another type of wireless data connection over which audio or other media content may be streamed.

Figure 1B:
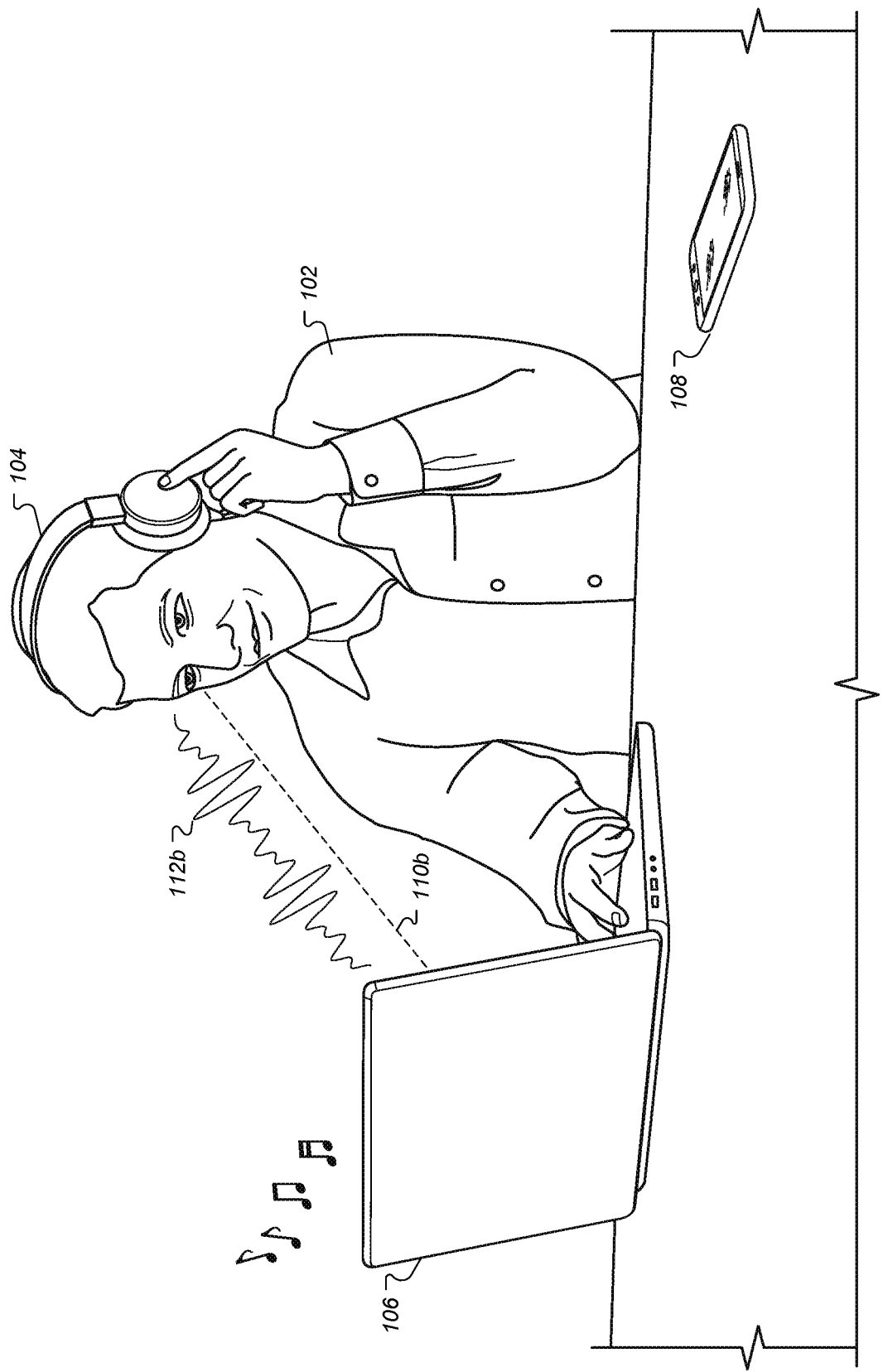

In FIG. 1B, the user 102 is shown switching from the smartphone 108 to the notebook computer 106 as the target streaming device (i.e., the streaming device that the headphones 104 are paired with to stream audio data). For example, the user 102 may have been listening to a streaming radio app on his smartphone 108 in FIG. 1A, but later wishes to watch a YOUTUBE video at the time represented in FIG. 1B. To switch target devices from the smartphone 108 to the notebook computer 106, the user 102 can generally perform two actions. The first action is to provide input to the headphones 104 to indicate that the user 102 wishes to re-pair the headphones 104 with a different streaming device. The second action is for the user 102 to identify a target streaming device that he wishes to pair with. Both actions can be relatively simple, and can minimize the time and effort for the user 102 to switch streams among different devices. One example of the first action by which the user 102 initiates pairing with a new device is shown by the user 102 tapping a surface of a speaker housing on the headphones 104. The headphones 104 may have sensors, buttons or other controls that detect when the user taps the headphones 104. One or more processors in the headphones 104 may interpret the tap as input to initiate pairing with a new target device.

The second action, by which the user 102 specifies the target device to which he would like to pair the headphones 104 with, can generally be performed by the user turning his head to gaze at the target device of his choice. Being as the headphones 104 move in coordination with the user's head when the headphones 104 are donned by the user 102, turning the head to look at a target device also causes a front portion of the headphones to be oriented toward the target device. The headphones 104 can then be configured to identify a target streaming device that the front portion of the headphones is oriented toward.

Various techniques can be employed that allow the headphones 104 to detect and identify a target streaming device located in front of the headphones 104. In some implementations, for example, the headphones 104 may include an infrared receiver to detect an identification signal emitted by an infrared transmitter on the streaming devices. Because the infrared signal is generally a line-of-sight signal, the headphones may only detect the signal when the infrared receiver on the front portion of the headphones is oriented toward the infrared transmitter on the target streaming device. Other techniques may also be employed, some of which are described briefly here, but are described in further detail below with respect to FIGS. 2A-5. For example, sound localization may be used to detect the location of a streaming device emitting an identification signal as a high-frequency tone, or a directional microphone on the headphones 104 may detect the tone when the headphones 104 are oriented toward the streaming device.

In some implementations, the user 102 may first turn to look at the target device that he wishes to pair with before providing the first input to initiate pairing. As such, the headphones 104 may automatically pair with a target streaming device that the user 102 and front portion of the headphones 104 are oriented toward at the time the user 102 taps the headphones 104 to initiate pairing. For example, the user 102 may cause the headphones 104 to switch from streaming audio from the smartphone 108 to streaming audio from the notebook computer 106 by tapping the headphones 104 while the user's gaze is directed toward the notebook computer 106 (indicated by the dashed line 110b in FIG. 1B). As a result of the user's actions to switch a source of the streaming audio, the audio stream 112a from smartphone 108 is terminated, and a second audio stream 110b is established over a new wireless connection between headphones 104 and the notebook computer 106. In some examples, the audio stream 112a from the smartphone 108 is not only terminated, but the smartphone pauses or stops playback of media (e.g., so that the smartphone does not suddenly start playing music over its loudspeakers and/or so that the media is paused at its current location so that the user can later resume playback where he left off).

In some implementations, the user 102 need not be looking at the target streaming device at the time the user 102 taps the headphones 104 to initiate pairing. The user 102 may instead turn to face the target streaming device of his choice after tapping the headphones 104. The headphones 104 may then pair with a target streaming device if one is identified within a pre-defined period of time after the headphones are tapped to initiate pairing. In some implementations, the headphones 104 may be configured to avoid accidental pairings that might occur as the user 102 inadvertently glances at one or more streaming devices that he does not wish to pair with. For example, the user 102 may hold his head relatively still toward a target streaming device for a period of time (e.g., 1-2 seconds) to confirm that he wishes to pair with the target streaming device. The headphones 104 may wait to complete pairing until the confirmation period has elapsed.

In some implementations, when the headphones 104 are paired with a new target streaming device, the headphones 104 may generate feedback to indicate to the user 102 that the headphones 104 have been paired. For example, a chime or other sound may be played by the headphones 104 to indicate that a new device has been paired, and/or to indicate a transition from one audio stream to another. In some implementations, the headphones 104 may generate visual feedback, such as by blinking a light emitting diode mounted on the headphones 104 upon pairing with a new device. In some implementations, the headphones 104 may vibrate to provide haptic feedback upon pairing with a new device.

Figure 1C:
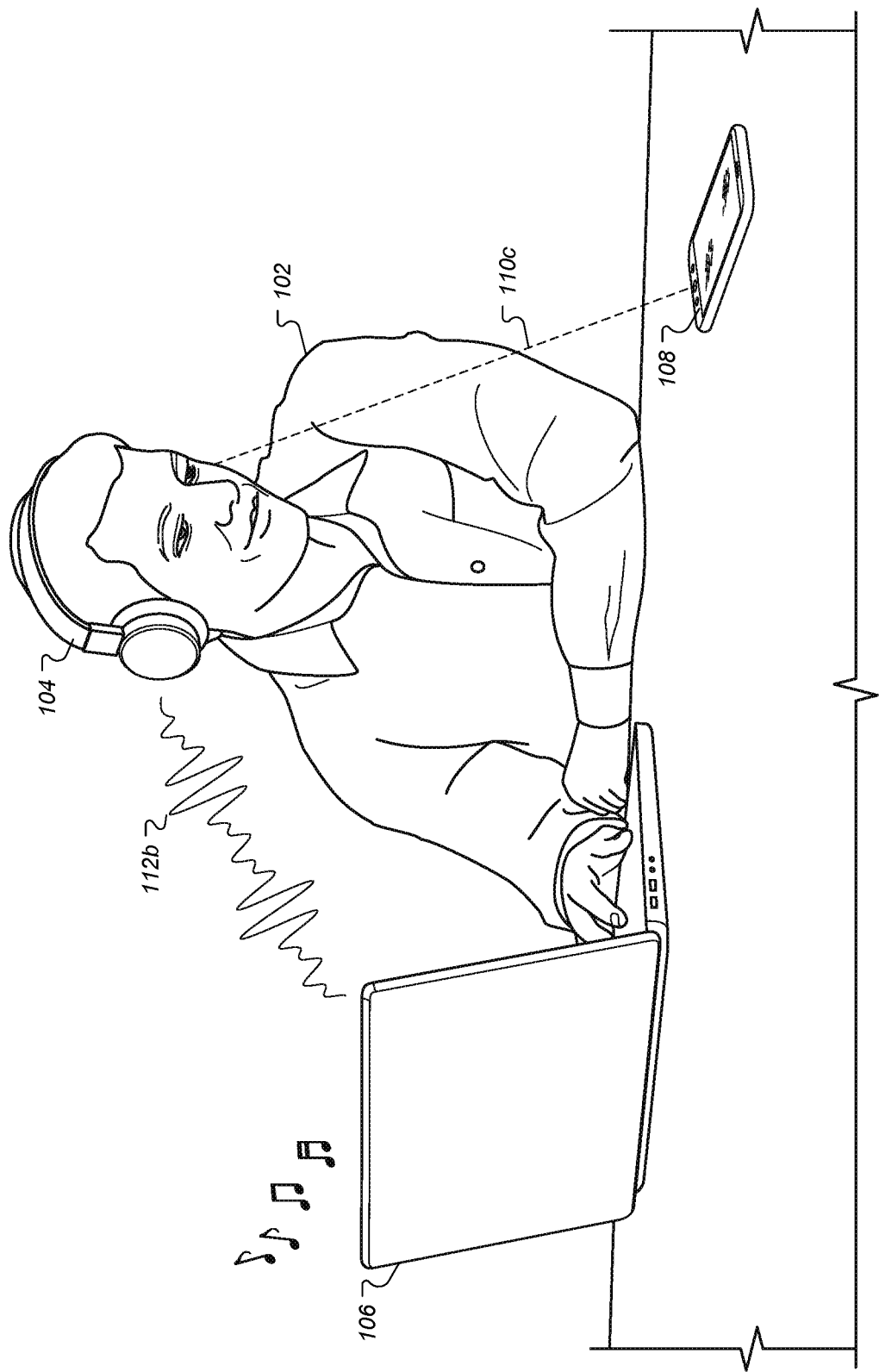

FIG. 1C next shows that the user 102 can continue to listen to audio through the headphones 104 streamed from the notebook computer 106, even as the user 102 turns his head to re-direct his gaze 110c to the smartphone 108 (or elsewhere). Generally, the user 102 may continue to work normally and move in any direction without affecting the second audio stream 110b, so long as the headphones 104 remain within a communications range of the notebook computer 106. For example, after indicating the target streaming device that the user 102 wishes to pair with, the user 102 need not continue to look at the device 102 to maintain the connection. The user 102 is free to look around and move as he pleases within the communication range of the devices.

FIG. 1D next depicts the user 102 tapping the headphones 104 so as to switch from streaming audio from the notebook computer 106 (stream 112b) to streaming audio from the smartphone 108 (stream 112c). Even though the user 102 had previously been facing the smartphone 108 in FIG. 1C, the headphones 104 can wait to pair with the smartphone 108 until user input is received to initiate pairing (e.g., tapping the headphones 104). The headphones 104 recognize that the front portion of the headphones 104 is oriented toward the smartphone 108, and can therefore identify that the smartphone 108 is the target streaming device with which to pair, rather than the notebook computer 106.

Figure 1E:
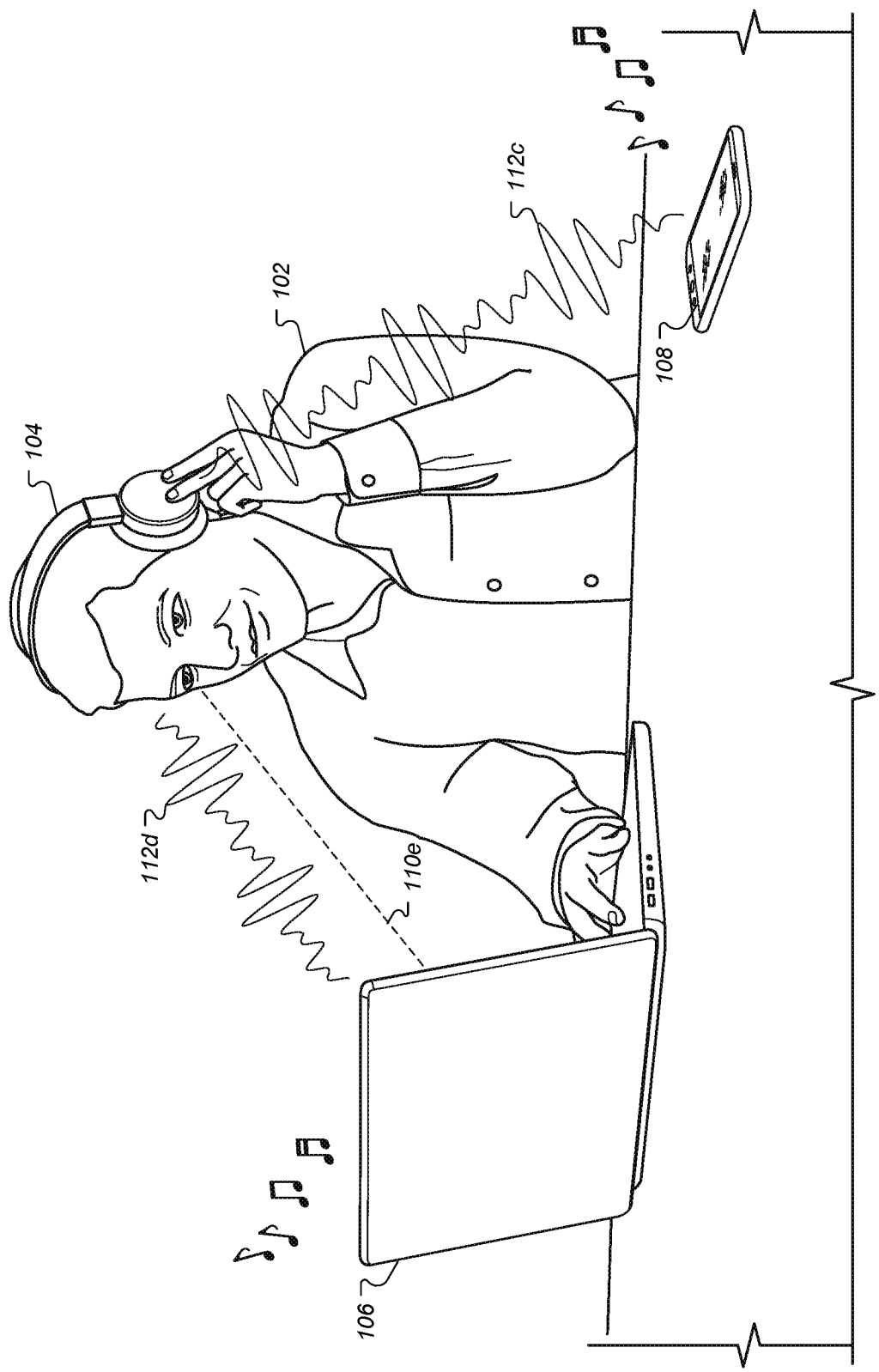

Lastly, FIG. 1E depicts the user 102 performing actions to establish concurrent connections for audio streaming between (i) the headphones 104 and the notebook computer 106, and (ii) the headphones 104 and the smartphone 108. In some circumstances, the user 102 may have a need to listen to audio originating from both the smartphone 108 and the notebook computer 106. For example, the user 102 may be watching a video on the notebook computer 106, but is monitoring audible alerts that are anticipated to be played by the smartphone 108 while the user 102 watches the video on the notebook computer 106. The user 102 may thus establish concurrent wireless data connections with the notebook computer 106 and the smartphone 108, and may stream and play audio from both devices 106, 108 at the same time. One example by which the user 102 may establish concurrent connections is shown in FIG. 1E. Recall from FIG. 1D that, in the time leading up to the event depicted in FIG. 1E, the headphones were paired only with the smartphone 108, and an audio stream 112c provided audio from the smartphone 108 to be played at the headphones 104. In contrast, in FIG. 1E, the user 102 has turned his head away from the smartphone 108 and toward the notebook computer 106 (indicated by dashed line 110e). The existing audio stream 112c from the smartphone 108 can be maintained without interruption, in some implementations. The user 102 then taps the side of the headphones 104 with two fingers, rather than the single finger that was used to tap the headphones 104 in FIGS. 1B and 1D. The two-finger tap may be differentiated by the headphones 104 from a single-finger tap, as each type of input may be associated with a different function on the headphones 104. For example, the single-finger tap may comprise user input to cause the headphones to switch streaming devices, in which case any existing audio streams may be suspended or terminated in favor of an audio stream for a newly identified target streaming device. The two-finger tap, in contrast, may comprise user input to cause the headphones 104 to pair an additional streaming device to stream concurrently with streams from other, previously-paired streaming devices. In some implementations, separate user-selectable controls may be provided on the headphones 104 that are each configured to perform a respective function, such as switching connections among different streaming devices or adding a concurrent stream from a newly paired device to existing streams from other devices. In response to the user's two-finger tap, the headphones 104 pair with the notebook computer 106, and establish a new audio stream 112d from the notebook computer 106 while maintaining an audio stream 112c from the smartphone 108. Although not shown, the headphones 104 may be capable of concurrently streaming audio from 3, 4, 5 or more devices in some implementations. The headphones 104 may provide a blended output so that each speaker of the headphones is playing both audio streams 112c and 113 at the same time. The headphones 104 may provide a segregated output so that a first speaker of the headphones is playing the audio stream 112c and a second speaker of the headphones is playing the audio stream 112d.

Figure 2A:
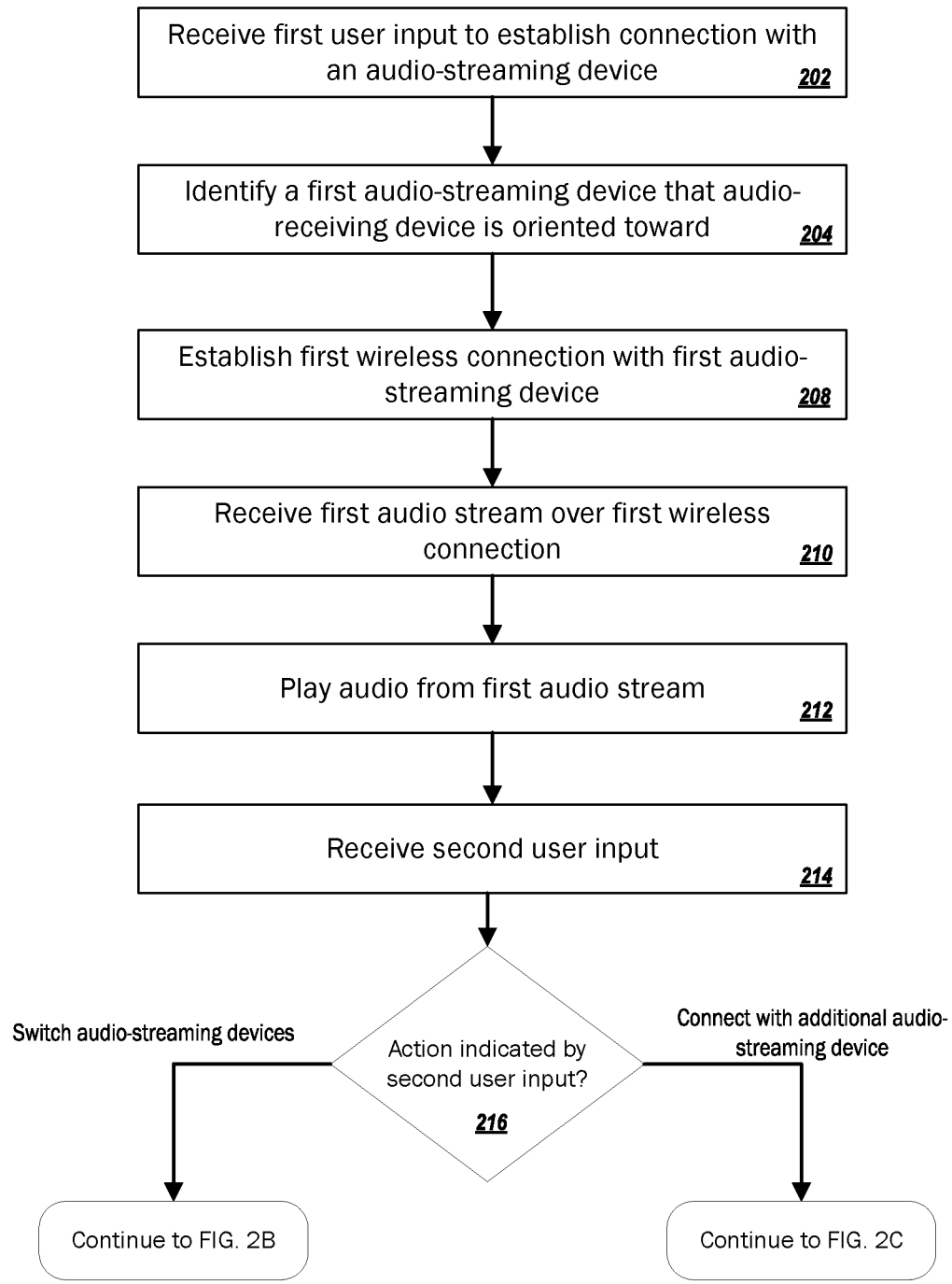
FIGS. 2A-2C depict flowcharts of an example process for pairing an audio-receiving device with one or more audio-streaming devices based on an orientation of the audio-receiving device with respect to an audio-streaming device, and/or based on a location of the audio-streaming device with respect to the audio-receiving device.
Figure 2B:
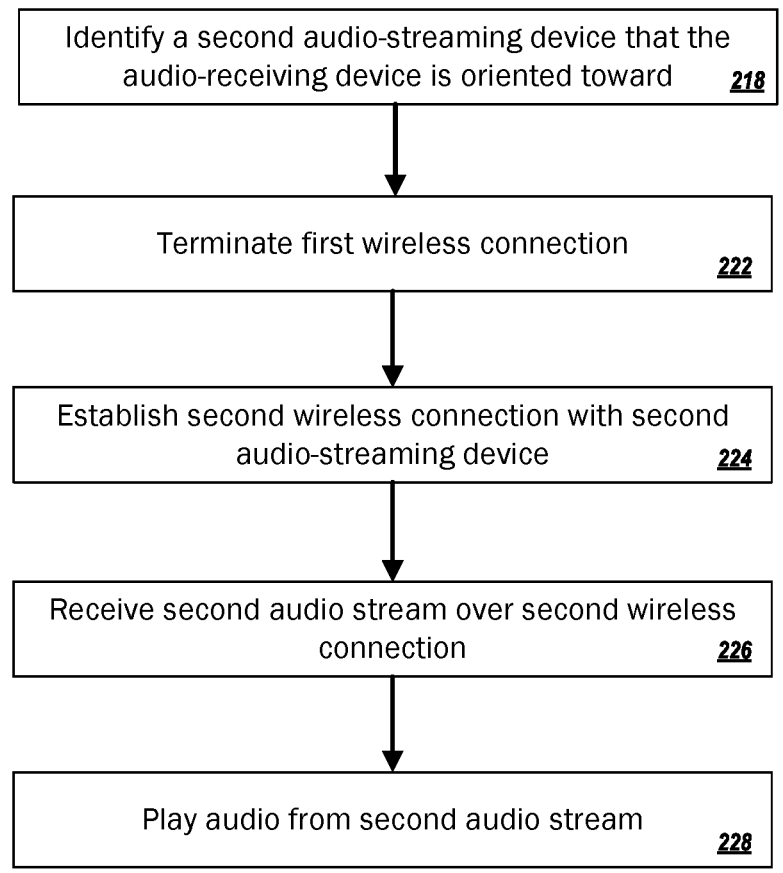
Figure 2C:
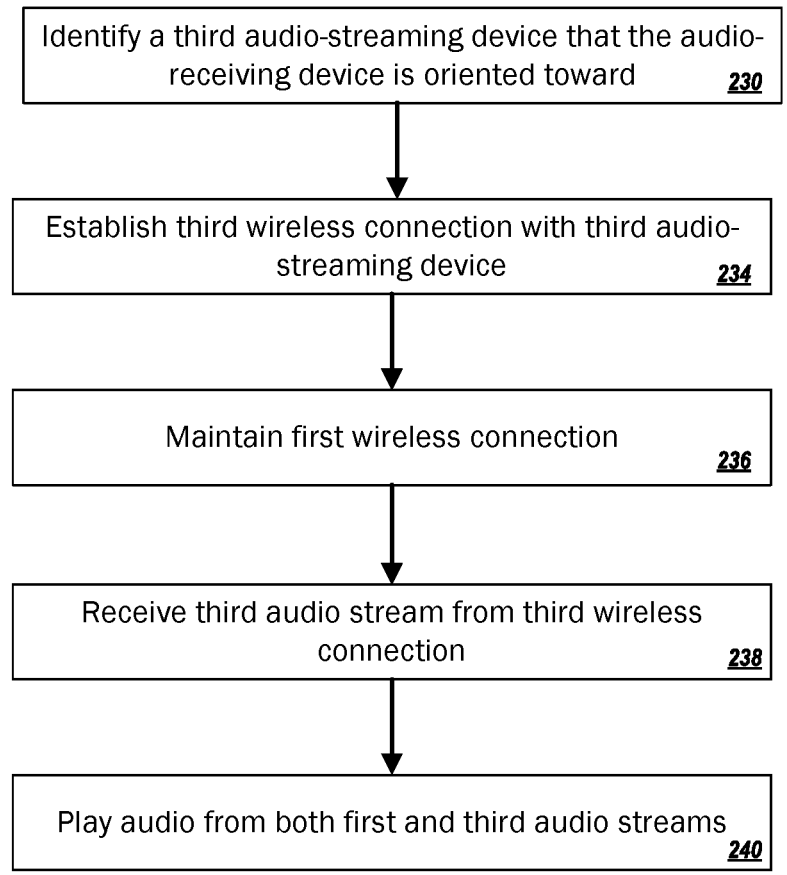

Referring to FIGS. 2A-2C, a flowchart is shown of an example process 200 for pairing a receiving device with one or more media-streaming devices. The process 200 is discussed by way of example with respect to a scenario in which the receiving device is an audio-receiving device (e.g., wireless headphones) and the streaming devices stream audio content (e.g., music, podcasts, or video audio). In some implementations, however, the process 200 may be applied in other scenarios to stream other types of media content, such as video, images, text, or a combination of these. In some implementations, the process 200 may be carried out with the systems, devices, and other techniques described in this document, such as the audio-streaming system 500 of FIG. 5, and/or the example computing system 600 of FIG. 6.

The process 200 can begin at stage 202, where an audio-receiving device receives input indicating that a user wishes to pair the receiving device with an audio-streaming device. In some implementations, the user input may be received while the receiving device is not yet paired with any streaming device, in which case the input can be to cause the receiving device to establish an initial pairing. In some implementations, the user input may be received while the receiving device is already paired with at least one streaming device. In this case, the user input may indicate whether to switch connections from the previously paired streaming device to a different streaming device, or whether to establish an additional connection with a new streaming device while maintaining connections with any previously paired devices. As described in further detail below, different types of user input may indicate whether to switch connections or to establish connections with multiple streaming devices.

In some implementations, the user input may be in the form of the user contacting a surface of the audio-receiving device to indicate a desire to initiate a pairing with a streaming device. For example, wireless headphones may be equipped with one or more controls on a surface of the headphones that may be selected by the user to initiate pairing. The control may be a physical button, such as a mechanical pushbutton, a touch-sensitive control (e.g., a capacitive button), a switch, a dial, or a combination of these, in some examples. The control may generally be disposed on the headphones at a location that is easily accessible to a user when the headphones are in use and worn by the user, such as on a housing of one of the speakers on the headphones. In some implementations, the control may be arranged so as to provide tactile feedback to the user to indicate that the user is contacting the control and/or to indicate when the user has the made a selection of the control to initiate a pairing.

In some implementations, other forms of user input may be employed, in addition or alternatively to tactile selection of a control on the audio-receiving device, to cause the audio-receiving device to pair with an audio-streaming device. For example, the user may provide input through a separate device (e.g., a personal computer or smartphone) distinct from the audio-receiving device to initiate pairing. The separate device may communicate an indication of the user input to the audio-receiving device, which in turn can respond by automatically taking action to pair with an audio-streaming device. As another example, wireless headphones may be equipped with accelerometers or other sensors to detect motion of the headphones. A user wearing the headphones may then nod or perform another gesture that the headphones are configured to recognize as being a pairing gesture. As another example, the user may provide a voice command (e.g., "pair with new device") as input to designate an intent to pair with a new device or multiple devices concurrently.

At stage 204, the audio-receiving device identifies a first audio-streaming device that at least a portion of the audio-receiving device is oriented toward. In subsequent stages of the process 200, the audio-receiving device may then pair with the first audio-streaming device as a result of the portion of the audio-receiving device being oriented to face the first audio-streaming device. In this manner, the first audio-streaming device can be easily identified without a need for the user to access a list of available streaming devices, and select the first audio-streaming device from the list. Rather, the approach described herein may allow users to quickly identify streaming devices to pair with, and to quickly switch connections between proximately located streaming devices. For example, university students, business professionals, and others often carry multiple devices—such as a smartphone and a notebook computer—that are each capable of streaming audio. At any given time, a user may have a need to switch from streaming audio from a first of his or her devices to a second of his or her devices. The user may have both devices set near each other at a workstation, for example. If the user is wearing wireless headphones, the user may then simply tap a control to initiate pairing, and turn his or her head so that sensors on a front side of the headphones are oriented toward the target device to which he or she desires to pair. Generally, the amount of effort involved for a user to pair the headphones with a streaming device can be fairly minimal. Of course, in some implementations and depending on the configuration of a given streaming device, the user may still be required to select a control on the streaming device in order to place the streaming device in a pairing mode to make the device available to be paired with the headphones or other receiving device. In some implementations, the streaming device may present a prompt that requires further user input to pair with the headphones (e.g., "Press this button to pair with the headphones"). In some implementations, no user action may be required to place the streaming device into a pairing mode.

In some implementations, the audio-receiving device may pair with a system as a result of the audio-receiving device being oriented towards a label or device that identifies the audio-streaming device, while the audio-streaming device may be located elsewhere. For example, suppose that an airport had a sign that read "Look here to pair with airport announcements," and that had a barcode for pairing with the airport announcement system or an electronic transmitter that transmitted a code for pairing with the airport announcement system. In both cases, the airport announcement system may be located elsewhere (e.g., up in the ceiling), but the user may be able to pair with that system by orienting the headphones toward the sign.

The audio-receiving device can be identified at a time proximate to a time when the user input is received to initiate pairing with an audio-streaming device. In some implementations, the audio-receiving device may attempt to discover an audio-streaming device to pair with in response to receiving the user input to initiate pairing. For example, a user may tap the side of his or her headphones to initiate pairing, which in turn triggers the headphones to search for an audio-streaming device to establish a connection with.

The headphones may monitor, for a period of time after receiving the user input to initiate pairing, signals detected by one or more sensors on the headphones until an audio-receiving device is identified as a result of the headphones being turned to face the audio-streaming device. The headphones, streaming device, or both may emit line-of-sight signals, for example, that may be detectable only when the devices are within a path of the line of sight signal and when at least one of the devices is oriented toward the other. A computer on the headphones may determine whether a line-of-sight signal emitted from an audio-streaming device is detected within the period of time (e.g., 5 seconds) from receipt of the user input. If so, the headphones may use the detected signal to pair with the audio-streaming device from which the signal was emitted. If no signal is detected within the period of time, then the headphones may cease searching for a streaming device to pair with, and may provide visual, aural, and/or haptic feedback to the user to indicate that pairing was unsuccessful.

In some implementations, rather than waiting for receipt of user input to begin searching for an audio-streaming device to pair with, the audio-receiving device may periodically or continuously monitor its surroundings so that an audio-streaming device toward which the headphones are oriented may already have been identified by the time that user input is received to initiate pairing.

In some implementations, the audio-receiving device can obtain an identifier for the first audio-streaming device based on a signal detected as a result of being oriented toward the first audio-streaming device. The identifier may be a unique code assigned to the first audio-streaming device, or may be any other type of information that identifies the first audio-streaming device. The identifier may be usable by the audio-receiving device to pair with the first audio-streaming device. For example, the identifier may be a MAC address assigned to the audio-streaming device. The MAC address may then be used in some protocols (e.g., BLUETOOTH protocols) for an audio-receiving device to pair with the audio-streaming device. In some implementations, the identifier may be encoded in a signal (e.g., a line of sight signal), that the audio-receiving device is configured to detect when at least a portion of the receiving device is oriented toward the audio-streaming device, but not when the portion of the receiving device is oriented away from the audio-streaming device. For example, a MAC address of the audio-streaming device may be encoded in an infrared data signal (e.g., IRdA) emitted by the audio-streaming device, which may be detected by an infrared receiver on the audio-receiving device.

Various technologies may be employed for the audio-receiving device to recognize when at least a portion of the streaming device is oriented toward an audio-streaming device, and to obtain an identifier for the audio-streaming device. A number of implementations involving these various technologies are described in further detail in the following paragraphs.

First, the audio-streaming device may be identified in some implementations by an infrared (IR) receiver disposed on a portion of the audio-receiving device. The IR receiver may be configured to detect an IR data signal emitted by an IR transmitter on the audio-streaming device. The IR transmitter may be arranged to emit a directed line-of-sight identification signal. The IR receiver on the audio-receiving device may then detect the line-of-sight signal when the IR receiver is located within a path of the IR signal, and when the IR receiver on the audio-streaming device is oriented toward the IR transmitter on the audio-streaming device. For example, an IR receiver may be disposed on a surface of a set of wireless headphones in a location that allows the IR receiver to detect an IR signal emitted by a streaming device located in front of the wireless headphones. The bit rate of an IR data signal emitted by the audio-streaming device may be sufficiently high (e.g., 2.4 kbits/second) to make transmission of a MAC address or other identifier of the streaming device occur in such a short period of time so as to not introduce noticeable delay to the user during the pairing process. In some implementations, other frequencies of electromagnetic signals may be used other than IR. For example, ultraviolet (UV) transmitters and receivers may be employed rather than or in addition to IR transmitters and receivers.

Second, the audio-streaming device may be identified in some implementations by passive IR techniques, which do not rely on active IR emitters at the audio-streaming devices. In these implementations, a reflective component may be affixed to any audio-streaming device to which the user may desire to pair. A unique identifier for the audio-streaming device may be printed on the reflective component, such as a barcode or a QR code. For example, a sticker having a unique identifier may be pressed onto streaming devices that a user may frequently use, such as a smartphone, tablet computer, notebook computer, and more. To read the identifier, the audio-receiving device may be provided with a camera or other image sensor that detects an image of the barcode, QR code, or other identifier. The image of the code may then be processed to read the identifier at the audio-receiving device. In some implementations, a retroreflective component (e.g., a sticker) may be attached to the audio-streaming device. The identifier on the retroreflective component may be invisible to the human eye, but may be detectable by sensors that detect certain types of electromagnetic radiation, such as infrared or ultraviolet. For example, wireless headphones may be equipped with an IR illuminator and an IR camera, which may respectively illuminate and capture images of the identifier printed on the retroreflective component.

In some implementations, the audio-receiving device may be equipped with a camera that is sensitive to light in the visible spectrum, such as light that can be seen by human eyes. The camera may capture images or video of an identifier (e.g., a barcode or QR code) printed on the audio-streaming device or otherwise associated with or affixed to the audio-streaming device. The identifier in the captured images or video may then be recognized and used to establish a wireless data connection between the audio-receiving device and the audio-streaming device.

Figure 3:
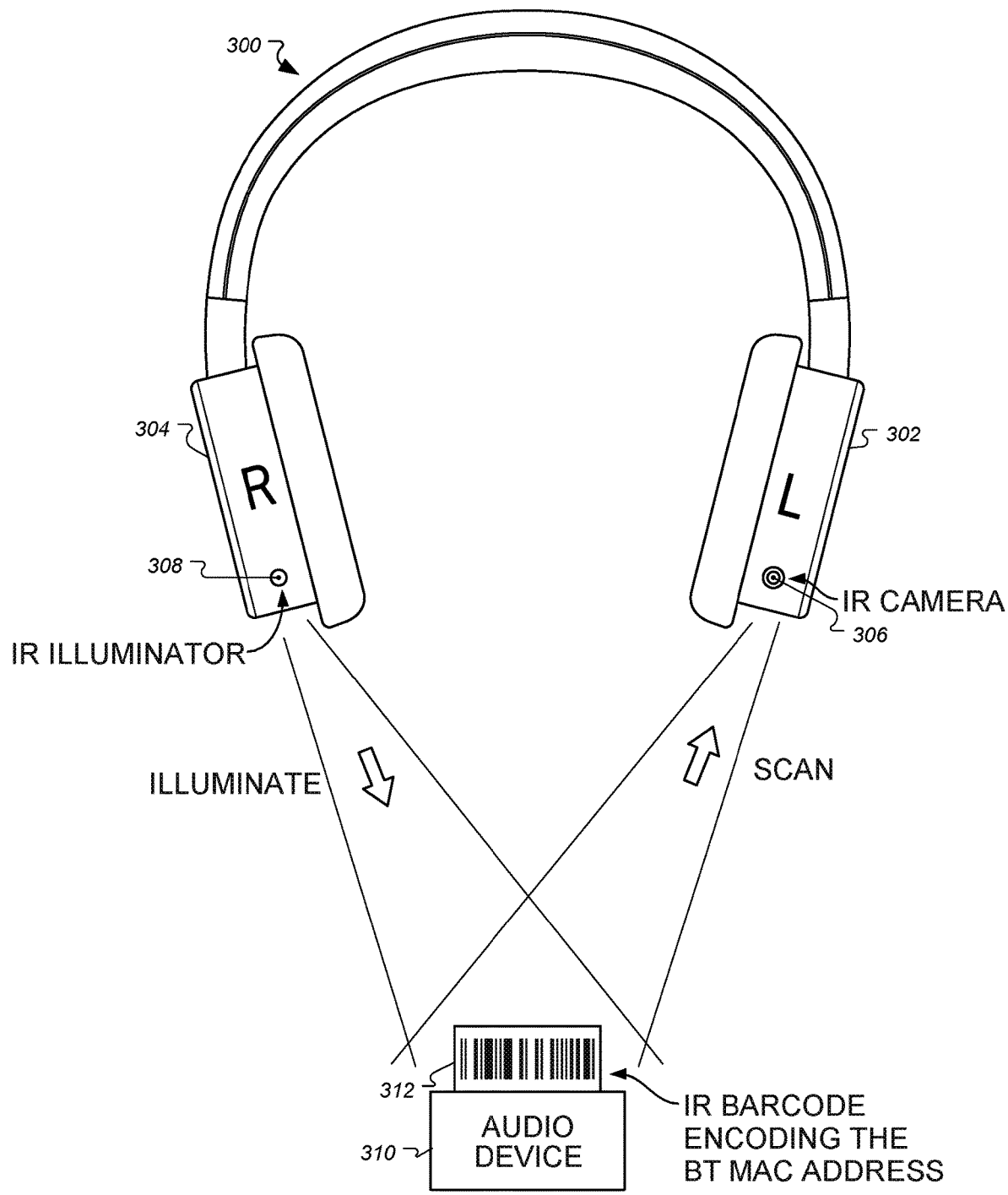
FIG. 3 depicts a schematic diagram of wireless headphones that employ an infrared illuminator and an infrared camera to obtain an identifier for an audio-streaming device located in front of the headphones when the headphones are oriented in a direction toward the audio-streaming device.

FIG. 3 shows an example configuration of a set of wireless headphones 300 that use an IR camera 306 and IR illuminator 308 to identify an audio-streaming device 310 toward which the headphones 300 are oriented. The audio-streaming device 310 includes an identifier on a retroreflective component 312, which may be attached to a surface of the streaming device 310. Although in the example of FIG. 3, the camera 306 and illuminator 308 are located proximate to different speakers 302, 304 on the headphones 306, in some implementations the camera 306 and illuminator 308 may be co-located on one of the speakers 302, 304 or elsewhere on the headphones 306. The IR illuminator 308 can include one or more IR lights arranged to illuminate a region in front of the headphones 300. Because the illuminator 308 is positioned on the right speaker 304 at a location offset from a center of the headphones 300, the illuminator 308 may be angled to illuminate a region in front of the headphones 300. Similarly, the IR camera 306 may be angled toward the region in front of the headphones 300 in order to scan the identifier from the retroreflective component 312 when the retroreflective component 312 is positioned in front of the headphones 300 within the shine of the illuminator 308. In this manner, the IR camera 306 can detect the identifier when the audio-streaming device 310 is located in front of the headphones 300. Moreover, because the illuminator 308 emits light in the infrared region, the illumination may be invisible to the human eye. One advantage to the passive IR configuration exemplified in FIG. 3 is that the retroreflective component 312 can be easily attached to an audio-streaming device 310 during manufacture of the device 310, or may be attached after-market by the owner of the device 310 with relatively low expense and effort.

Figure 4:
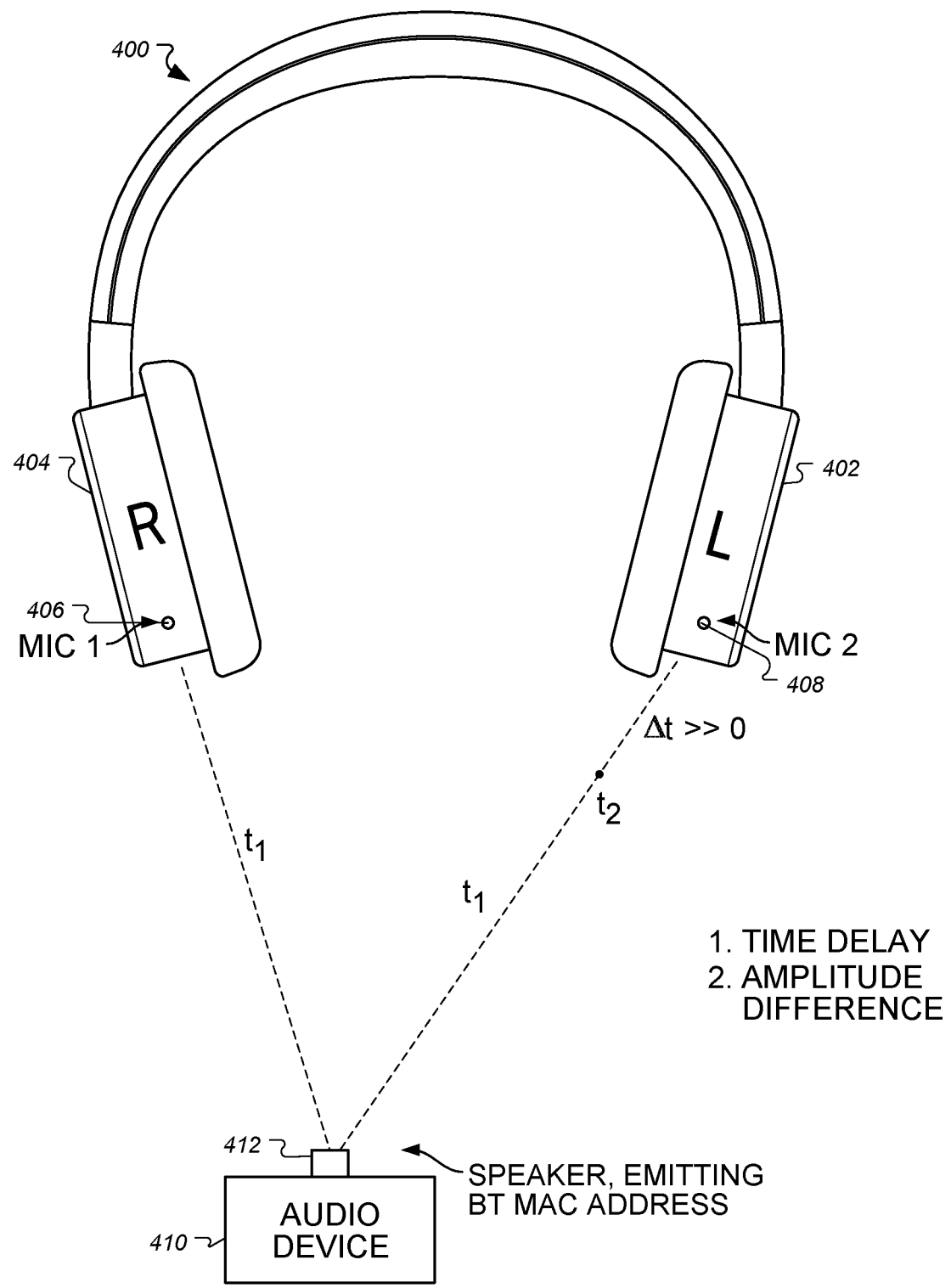
FIG. 4 depicts a schematic diagram of wireless headphones that compare respective instances of a high-frequency audio identification signal emitted by an audio-streaming device, which are detected at a pair of microphones on the headphones in order to determine when the audio-streaming device is located in front of the headphones.

FIG. 4 depicts one example of another approach (scheme) by which an audio-receiving device may identify an audio-streaming device as being located in front of at least a portion of the audio-receiving device. The approach in FIG. 4 generally uses sound localization techniques to determine a location of an audio-streaming device relative to an audio-receiving device. Based on one or more characteristics of an audio signal emitted by the audio-streaming device, the audio-receiving device can determine the relative location of the audio-streaming device. In particular, differences among the audio signal as detected by two or more microphones disposed at separate locations on the audio-receiving device may indicate the location of the audio-streaming device relative to the audio-receiving device (or relative to a portion of the audio-receiving device).

In the example of FIG. 4, a set of wireless headphones 400 includes a pair of microphones 406, 408 for detecting an audio-based identification signal emitted by a speaker 412 of an audio-streaming device 410. The identification signal emitted by the speaker 412 may be encoded with an identifier for the audio-streaming device 410, such as a BLUETOOTH MAC address that has been uniquely assigned to the audio-streaming device 410. In some implementations, the MAC address or other identifier may be modulated on a high frequency tone emitted by the speaker 412, such that the identification signal is above the hearing range of most people (e.g., above 20 kHz). A first microphone 406 among the pair of microphones 406, 408 may detect a first portion of the identification signal from the audio-streaming device 410 arriving at the right speaker of the headphones 400, while a second portion of the identification signal from the audio-streaming device 410 arriving at the left speaker of the headphones 400 may be detected by the second microphone 408. One or more computers on the headphones 400 may then compare the respective portions of the identification signal detected by the first and second microphones 406, 408, respectively, to determine the relative location of the audio-streaming device 412 relative to the headphones 400. Due to the separation of the first microphone 406 on the right speaker 404 of the headphones 400, and the second microphone 408 on the left speaker 402 of the headphones 400, differences in the respectively detected portions of the audio signal can be determined that indicate the relative location of the audio-streaming device 410. As the distance that the audio signal must travel from the speaker 412 to one of the microphones 406, 408 increases, the amplitude of the signal may become more attenuated. Moreover, the transmission delay for the sound to reach either of the microphones 406, 408 may increase as the distance between the speaker 412 and the microphones 406, 408 increases. As such, differences among the amplitudes and time delays of the portions of the audio-based identification signal detected by the first and second microphones 406, 408 may indicate whether the audio-streaming device 410 is located closer to the first microphone 406 or the second microphone 408. When the differences in the amplitudes, time delays, or both fall below a threshold difference, then the headphones 400 may determine that the streaming device 410 is centrally located between the left and right speakers 402, 404 of the headphones 400, and that the front of the headphones 400 are oriented in a direction facing the streaming device 410. The headphones 400 may then respond by using the identifier encoded in the audio-based identification signal to pair with the audio-streaming device 410, if the user has indicated an intent to initiate pairing. In some implementations, three, four, five, or more microphones may be spaced at various locations of the headphones 400, and differences among the audio-based identification signal detected at each of the headphones may be determined, so as to identify the location of an audio-streaming device 410 with even greater accuracy.

In some implementations, other sound-based identification techniques may be used, additionally or alternatively to sound localization techniques, to identify a streaming device that the audio-receiving device is oriented toward. For example, the streaming device may have a speaker that emits a high-frequency tone encoded with an identifier for the streaming device (e.g., an identification signal like that emitted by speaker 412). The tone may generally be emitted omni-directionally, or may be directed in one or more particular directions. In order to detect that the streaming device is located in front of the receiving device, or in front of a portion of the receiving device, the receiving device may have a directional microphone that is sensitive to sound emanating from in front of the microphone, but that is substantially insensitive to sound emanating from other directions. The microphone can be configured on the receiving device to detect the high-frequency identification signal from the streaming device when the receiving device is oriented toward the streaming device. Moreover, if multiple audio-streaming devices are located in proximity of each other and each emits a respective identification signal detected by the microphone of the audio-receiving device, a target device can be selected to pair with based on characteristics of the respective signals. For example, the streaming device whose signal has the highest intensity may be selected for pairing under the expectation that the highest intensity signal emanates from the streaming device that the receiving device is most directly oriented toward.

In some implementations, the audio-streaming device may periodically or continuously emit the high-frequency audio identification signal. In this manner, the signal may constantly be available for detection by the audio-receiving device whenever the user desires to pair with an audio-streaming device. Of course, constantly repeating emissions can be undesirable in some situations, such as where it is desired to minimize the power consumption of the streaming device. Therefore, in some implementations, the streaming device may be configured to emit its identification signal only upon request. For example, the audio-receiving device may have a speaker which, in response to user input to initiate pairing, emits an activation signal to cause any streaming devices within range of the audio-receiving device to begin emitting their respective identification signals. In some implementations, the activation signal may be a high-frequency audio signal (e.g., above 20 kHz) that is played through one or more speakers of the audio-receiving device. The streaming devices may then have microphones that detect the activation signal, and may respond to the activation signal by emitting an audio, infrared, or other type of identification signal according to any of the implementations described herein. In some implementations, the activation signal may be encoded with identifiers for streaming devices that have previously registered with the receiving device, so that the activation signal only activates particular devices that belong to a particular user. Streaming devices that may be in range of the activation signal, and which may belong to other users for example, may ignore the activation signal if their respective identifiers are not contained in the signal (e.g., by choosing to not emit an identification signal in response to the activation signal).

Referring again to FIG. 2A, after identifying an audio-receiving device toward which the first audio-streaming device is oriented (stage 204), the process 200 of pairing the receiving device with the first streaming device continues. At stage 208, the receiving device and the first streaming device can establish a first wireless data connection. The data connection can generally be configured to allow for transmission of streaming audio data (e.g., music or speech) from the streaming device to the receiving device. In some implementations, the data connection can be made according to a pre-defined communications protocol such as BLUETOOTH. The connection may be automatically established upon receiving the indication of user input to initiate pairing and identification of the first audio-streaming device. In some implementations, the identifier for the first audio-streaming device can be used, along with any other applicable registration information, to establish the data connection. However, because the receiving device may have obtained the identifier or other applicable registration information from signals outputted or reflected by the first audio-streaming device, no additional user input may be required for the data connection to be established. Upon establishing the wireless connection, any audio being played by the first audio-streaming device can be streamed to the receiving device at stage 210. The receiving device can then process the stream and convert the encoded audio data into a raw audio signal that is played through one or more speakers of the receiving device at stage 212. In some implementations, the speakers of the receiving device may be integrated components in an assembly of the receiving device, such as the left and right speakers of set of wireless headphones. In some implementations, the speakers of the receiving device may be external to at least a portion of the audio-receiving device, such as standalone speakers that are connected to a central portion of the audio-receiving device via speaker wires.

While paired and playing audio streamed from the first audio-streaming device, at stage 214 the audio-receiving device receives second user input to initiate pairing with another audio-streaming device. Because the receiving device is already paired with the first audio-streaming device, the user input may indicate how the new streaming device should be paired and whether to maintain the first wireless connection with the first audio-streaming device. In some implementations, a first type of user input may indicate that the user intends to switch connections from the first audio-streaming device to a second audio-receiving device. Switching connections can involve automatically terminating the first wireless data connection between the receiving device and the first audio-streaming device, and establishing a new connection with the second audio-streaming device. Even if the first wireless data connection is not terminated, switching can at least involve ceasing to play audio streamed from the first audio-streaming device and establishing the new connection with the second audio-streaming device to play audio streamed from the second device. In some implementations, a second type of user input may indicate that the user would like to add a second wireless data connection with a second streaming device on top of the first connection with the first streaming device. In other words, the second type of user input may be to cause the audio-receiving device to pair with multiple streaming devices so that respective audio streams from each of the streaming devices may be played concurrently by the audio-receiving device. For example, a user who is on hold during a telephone call may wish to listen to music from another streaming device until the call becomes active again. In order to monitor when the hold period ends and the call is again active, the user may cause the receiving device to be simultaneously paired with both phone and a separate device streaming the user's music.

At stage 216, the audio-receiving device determines which action is indicated by the second user input. If the second input is to cause the receiving device to switch connections from the first audio-streaming device to a second audio-streaming device, the process 200 continues to the flowchart depicted in FIG. 2B. On the other hand, if the second input is to cause the receiving device to add a second connection on top of the existing connection with the first streaming device, the process 200 continues to the flowchart depicted in FIG. 2C. As previously mentioned, different types or forms of user input may indicate which path to follow. For example, separate buttons or other controls may be disposed on a housing of the audio-receiving device for switching devices and for pairing with additional devices. Selection of a first such control may cause the audio-receiving device to terminate the first connection with the first audio-receiving device and to establish a new connection with a second audio-receiving device. Selection of a second such control may cause the audio-receiving device to maintain the first connection with the first audio-receiving device while pairing with an additional streaming device. In some implementations, different gestures from the user may indicate which path to follow. For example, a set of wireless headphones may have a touch sensitive surface on the housing of one of the speakers of the headphones. Tapping the surface of the headphones with a single finger may indicate that the headphones should switch streaming sources, whereas tapping the surface of the headphones with two fingers may indicate that the headphones are to pair with an additional device simultaneously as the connection is maintained with the first audio-streaming device. In some implementations, the wireless headphones or other audio-receiving device may have accelerometers, microphones, or other sensors that can detect when a housing of the receiving device is tapped. The user can then perform different numbers of taps in succession to indicate whether switching or multiple connections is desired. For example, a single tap may be to cause the headphones to switch connections among streaming devices, and a double-tap may be to cause the headphones to pair with another streaming device concurrently with the first streaming device.

If the second user input was to switch connections among streaming devices, the process 200 continues as shown in FIG. 2B. At stage 218, the audio-receiving device identifies a second audio-streaming device located in front of the receiving device that at least a portion of the receiving device is oriented toward. The second audio-streaming device can be identified according to any of the techniques that the first audio-streaming device was identified at stage 204, including the techniques discussed with respect to FIGS. 3 and 2, for example. To switch connections, the audio-receiving device then terminates the first wireless connection (stage 222), establishes a new wireless connection with the second audio-streaming device (stage 224), receives a second stream of audio data over the new wireless connection from the second audio-streaming device (stage 226), and plays audio from the second stream through one or more speakers of the audio-receiving device (stage 228).

If the second user input was to pair with an additional streaming device, rather than to switch connections among streaming devices, the process 200 continues from stage 216 in FIG. 2A to stage 230 in FIG. 2C. At stage 230, the audio-receiving device identifies a third audio-streaming device located in front of the receiving device that at least a portion of the receiving device is oriented toward. The third audio-streaming device can be identified according to any of the techniques that the first audio-streaming device was identified at stage 204, including the techniques discussed with respect to FIGS. 3 and 2, for example. To establish multiple connections, the audio-receiving device establishes a third wireless data connection with the third audio-receiving device (stage 234), while maintaining the first wireless data connection with the first audio-streaming device (stage 236). The receiving device can then begin receiving a third stream of audio data over the third wireless connection (stage 238), and can simultaneously play streamed audio from both the first and third audio-streaming devices (stage 240). In some implementations, the user may be able to independently adjust the volume levels of each audio stream, and/or may be able to mute one stream while the other stream continues to be played.

The process 400 has been described by way of example with respect to streaming audio. In some implementations, the process 400 may be carried out with devices that stream other types of media content as well, such as video, images, text, or a combination of these. For example, the receiving device may be a portable video playing device that include a liquid crystal display (LCD) or other type of electronic display, and may be configured to play video received from a video streaming device. A user of the portable video playing device may orient a portion of the device to face a target streaming device that the user would like the video playing device to pair with, and the video playing device may identify the streaming device accordingly. In some implementations, the presentation components of the receiving device may not be integrated in the receiving device itself, but may instead be external to the receiving device and in wired or wireless communication with the receiving device. For example, the receiving device may be a remote control for selecting a streaming device to connect to an input channel of a home entertainment system. For example, the user may point the remote control at a smartphone, laptop, or other streaming device that he or she would like to play through speakers and/or a display of the home entertainment system, and may press a pairing button on the remote control to pair a receiver of the home entertainment system (which may be the remote control itself or a separate device) with the target streaming device that the remote control is pointed at. Pairing may then be carried out according to the methods, systems, devices, and other techniques described in this document. For example, the remote control may detect an infrared or other line of sight identification signal from the target streaming device to obtain an identifier from the target streaming device. The identifier may then be used to pair the receiver with the target streaming device. If the receiver is separate from the remote control, the remote control may transmit the identifier and any other information about the target streaming device to the receiver for use in the pairing process.

Figure 5:
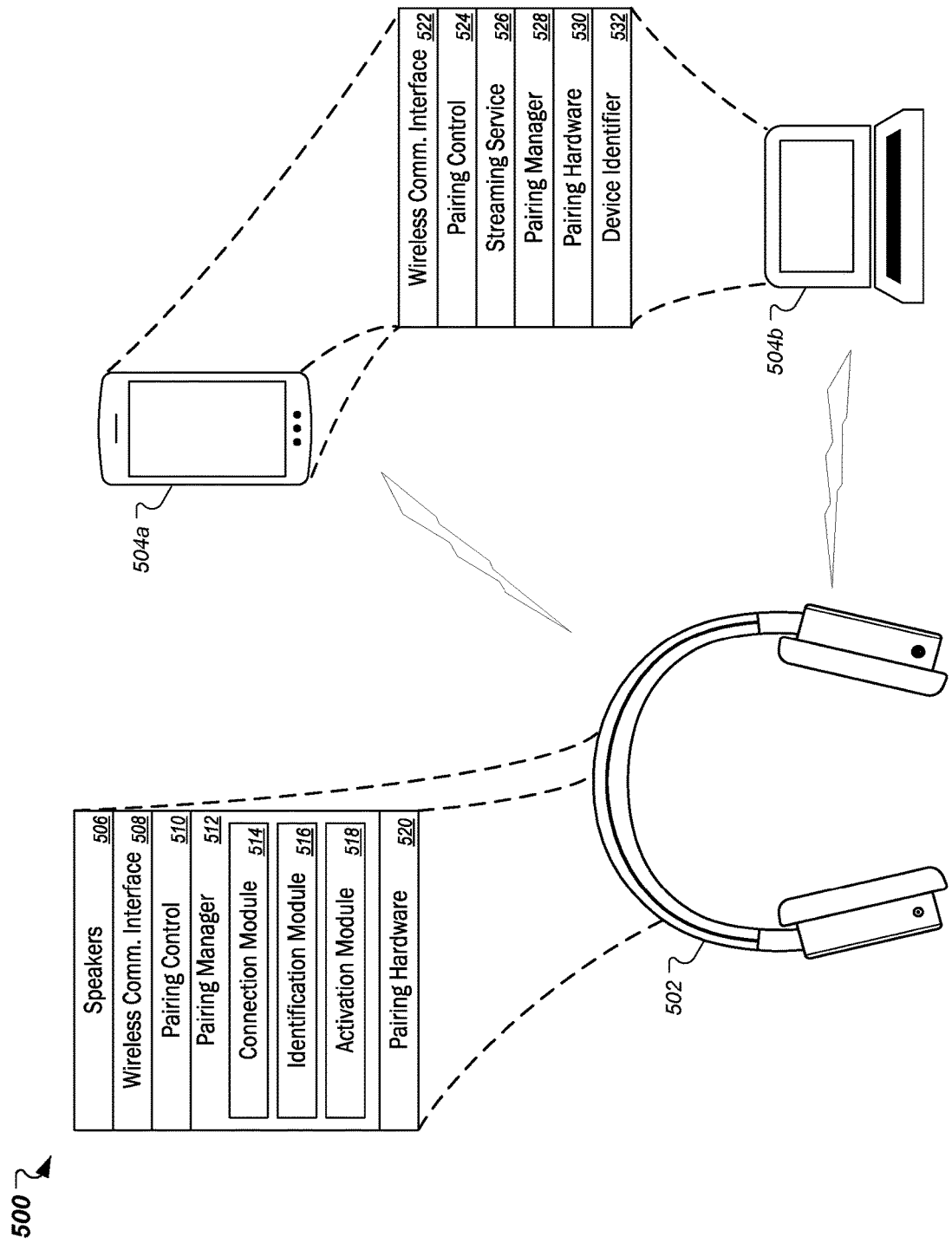
FIG. 5 depicts an example wireless headphones device configured to pair with audio-streaming devices identified based on a location and/or orientation of the wireless headphones device and an audio-streaming device.

FIG. 5 depicts an example system 500 of wireless headphones device 502 configured to pair with audio-streaming devices 504a, 504b based on a location and/or orientation of the headphones 502 and the streaming devices 504a, 504b. In some implementations, the headphones 502 may be used to carry out the techniques described with respect to FIGS. 1A-4. The headphones 502 may also include a computer system, or a portion of a computer system, like that depicted in FIG. 6. For example, the headphones 502 may include one or more processors arranged to identify target streaming devices, to perform pairing, and to stream audio according to any of the techniques described herein. Moreover, although FIG. 5 depicts wireless headphones 502 as an example wireless receiving device, it should be appreciated that similar arrangements may also be applied to other types of wireless receiving devices, such as wearable devices and loud speakers.

The headphones 502 are generally configured to pair with audio-streaming devices that have been identified based on an orientation and/or location of the headphones 502 relative to the audio-streaming devices. The headphones 502 may include a pair of speakers 506, a wireless communications interface 508, a pairing control 510, a pairing manager 512, and pairing hardware 520. Some implementations may include particular combinations, but not all, of these components.

The headphones 502 can play streamed audio through the pair of speakers 506. The wireless communications interface 508 may be configured to establish a wireless data connection with one or both of the audio-streaming devices 504a, 504b, such as a BLUETOOTH wireless connection. An audio stream can be transmitted over the wireless connection, and the transmitted audio stream can be received and processed by the wireless communications interface 508.

The headphones 502 can further include a pairing control 510. The pairing control 510 may be selected by the user to initiate pairing with an audio-streaming device 504a or 504b. For example, the pairing control 510 may be a button, a switch, or a dial. The pairing control 510 may be mechanically actuated, and/or may be a touch-sensitive component (e.g., a single capacitive or resistive touch-sensitive button or an array of multiple touch sensors). In some implementations, the pairing control 510 may be located on an exterior surface of the headphones 502 to allow the user to easily contact the control 510 to initiate pairing. The pairing control 510 may be arranged to distinguish between different types of user input, in some implementations. For example, the pairing control 510 may include a first portion that, when contacted by the user, causes the headphones 502 to switch audio streams by terminating an existing wireless connection with one device and pairing with a newly identified streaming device. A second portion of the pairing control 510, in contrast, may be contacted to cause the headphones 502 to pair with a newly identified device while maintaining any existing connections with other streaming devices. In some implementations, the pairing control 510 may distinguish different forms of user input to determine a function to perform in response to the user input. For example, a single tap on the pairing control 510 may indicate that the user wishes to switch connections, whereas a double tap on the pairing control 510 may indicate that the user wishes to establish connections for streaming from multiple devices.

The pairing manager 512 of the headphones 502 is operable to establish and terminate wireless data connections with one or more streaming devices 504a, 504b. In some implementations, the pairing manager 512 can include a connection module 514, an identification module 516, and an activation module 518. The connection module 514 may host the BLUETOOTH protocol or other protocol for making wireless data connections, and may coordinate with the wireless communications interface 508 to establish, maintain, and pair with the audio-streaming devices 504a, 504b. The identification module 516 is configured to coordinate with one or more sensors or other pairing hardware 520 on the headphones 502 to determine when a front portion of the headphones is oriented toward one of the audio-streaming devices 504a, 504b, and to obtain an identifier for the target audio-streaming device that is usable by the headphones 502 to pair with the target audio-streaming device. In some implementations, the audio-streaming devices 504a, 504b may need to be placed in a pairing mode in order to be paired with.

In some implementations, the audio-streaming devices 504a, 504b may be manually placed into the pairing mode by the user selecting a pairing control 524 on the streaming devices 504a, 504b. In some implementations, to avoid the need for the streaming devices 504a, 504b to be manually placed into the pairing mode, the streaming devices 504a, 504b may listen for an activation signal from the headphones 502. The activation signal can be generated by the activation module 518. The signal may be an electromagnetic signal and/or an audio signal (e.g., a high-frequency tone) in some implementations. When the audio-streaming devices 504a, 504b detects the activation signal, the audio-streaming devices may automatically transition into pairing mode, and may emit an identification signal. The identification signal may include a MAC address or other unique identifier for the corresponding streaming device 504a, 504b from which the signal is emitted. The identification signal may be detected by the pairing hardware 520 on the headphones 502. The form of the identification signal may depend on the scheme the identification scheme employed by the headphones 502 and audio-streaming devices 504a, 504b. Any of the identification schemes discussed herein may be employed. For example, an infrared signal containing an identifier for the audio-streaming device 504a or 504b may be transmitted to the headphones 502, or sound localization techniques may be used by the headphones 502 to detect a high-frequency audio tone encoded with an identifier for one of the audio-streaming devices 504a, 504b. The headphones 502 may be equipped with appropriate hardware 520, such as microphones, infrared illuminators, and/or infrared receivers depending on the particular identification schemed employed.

Each of the streaming devices 504a, 504b may include hardware and software to wirelessly stream audio content to the headphones 502. In some implementations, the streaming devices 504a, 504b may be pre-configured by the device manufacturers with capabilities for pairing with the headphones 502. For example, the devices 504a, 504b may include a built-in infrared transmitter to emit an identification signal to the headphones 502 for pairing. In some implementations, the streaming devices 504a, 504b may not be especially adapted for the pairing techniques discussed in this document, but may be adapted for such purpose in the after-market. For example, a user may attach retroreflective stickers with a barcode or other identifier onto the housings of the streaming devices 504a, 504b, which can be illuminated by an infrared light source on the headphones 502 and detected by an infrared camera on the headphones 502.

In some implementations, the streaming devices 504a, 504b may each include a wireless communications interface 522 to wirelessly communicate with the headphones 502. The devices 504a, 504b may also include a pairing control that the user may select to place the devices 504a, 504b into a pairing mode in which the devices 504a, 504b emit an identification signal that identifies the respective devices 504a, 504b and that indicates the devices 504a, 504b are available to be paired. A streaming service 526 on the devices 504a, 504b may provide music or other content to be streamed. For example, the streaming service 526 may be a media player application, a podcast player, or a streaming radio application. The pairing manager 528 on the streaming devices 504a, 504b may coordinate the process of pairing with the headphones 502. For example, the pairing manager 528 may generate an identification signal when the devices 504a, 504b are placed into pairing mode. The identification signal may include a unique device identifier 532 that has been assigned to the corresponding device 504a or 504b. Finally, the streaming devices 504a, 504b may include appropriate pairing hardware 530 to emit the identification signal that can be detected by the headphones 502 during the pairing process. The particular pairing hardware 502 on a given streaming device 504a, 504b may vary according to the scheme used by the headphones 502 to detect when the front of the headphones 502 is oriented toward one of the streaming devices 504a, 504b. For example, in one scheme, the streaming devices 504a, 504b may have an infrared transmitter. In another scheme, the streaming devices 504a, 504b may have a speaker for emitting a high-frequency identification tone.

Figure 6:
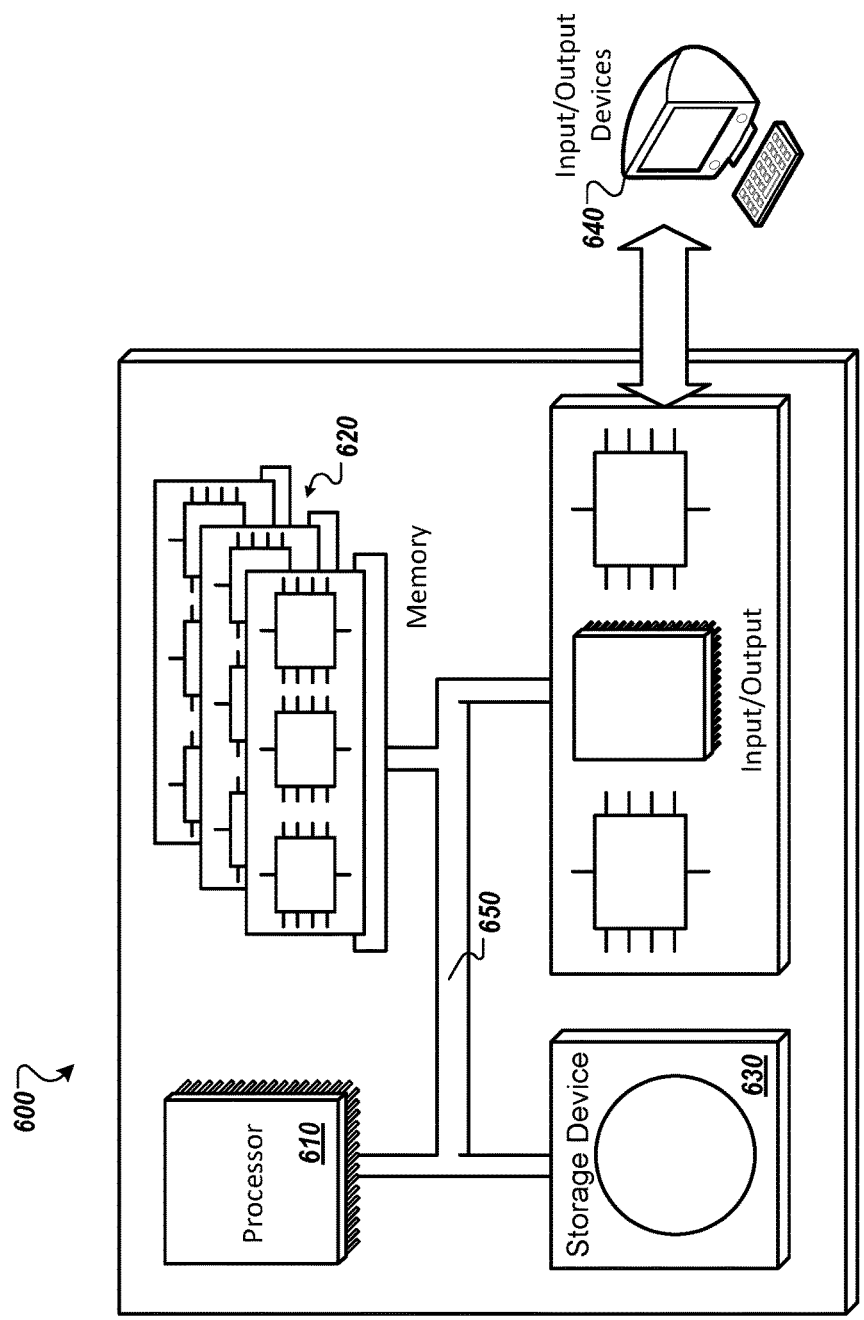
FIG. 6 depicts a schematic diagram of an example computer system that can be used to perform the operations associated with the computer-implemented methods and other techniques described herein. All or a portion of the example computer system in FIG. 6 may be implemented in an audio-receiving device, such as wireless headphones.

FIG. 6 is a schematic diagram of a computer system 600. The system 600 can be used to carry out the operations described in association with any of the computer-implemented methods or other techniques described previously, according to some implementations. The system 600 is intended to include various forms of digital computers, such as laptops, desktops, workstations, personal digital assistants, servers, blade servers, mainframes, and other appropriate computers. The system 600 can also include mobile devices, such as personal digital assistants, cellular telephones, smartphones, and other similar computing devices. In some implementations, the system 600 can include wireless receiving devices such as wireless headphones, or media-streaming devices such as smartphones or computers. For example, all or portions of the system 600 may be provided in a set of wireless headphones and may be configured to communicate with an audio streaming device, to perform pairing operations, and to process streamed audio content. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. The processor may be designed using any of a number of architectures. For example, the processor 610 may be a CISC (Complex Instruction Set Computers) processor, a RISC (Reduced Instruction Set Computer) processor, or a MISC (Minimal Instruction Set Computer) processor.

In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 400. In one implementation, the storage device 630 is a computer-readable medium. In various different implementations, the storage device 630 may be a floppy disk device, a hard disk device, an optical disk device, or a tape device.

The input/output device 640 provides input/output operations for the system 400. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
at an electronic device having one or more processors, memory storing one or more programs, one or more sensors and one or more speakers:
receiving a first stream of audio data from a first streaming device and playing the first stream of audio data via the one or more speakers, wherein the electronic device is coupled to the first stream of audio data via a first wireless data connection;
while playing the first stream of audio data:
detecting a user input requesting the electronic device that is currently coupled to the first streaming device to establish a second wireless data connection with a second streaming device that is distinct from the first streaming device; and
detecting based on a changed orientation of the one or more sensors towards the second streaming device input signals identifying the second streaming device;
in response to detection of the user input and the input signals, establishing the second wireless data connection between the electronic device and the second streaming device;
receiving a second stream of audio data from the second streaming device over the second wireless data connection; and
causing audio encoded in the second stream of audio data to be played through the one or more speakers of the electronic device.

2. The method of claim 1, wherein the electronic device comprises wireless headphones, the wireless headphones including the one or more speakers and a wireless communications interface for establishing the first and second wireless data connection with the first and second streaming devices, respectively.

3. The method of claim 2, wherein detecting the user input comprises identifying that a control located on the wireless headphones has been selected by the user input.

4. The method of claim 1, further comprising:
in response to establishing the second wireless data connection between the electronic device and the second streaming device, generating at least one of visual feedback and aural feedback with the electronic device to indicate to a user of the electronic device that the second wireless data connection has been established.

5. The method of claim 1, wherein detecting the input signals identifying the second streaming device further includes obtaining an identifier of the second streaming device when the one or more sensors of the electronic device are oriented toward the second streaming device to locate the second streaming device in front of the one or more sensors.

6. The method of claim 1, wherein the input signals include a line-of-sight signal emitted by the second streaming device, and detecting the input signals identifying the second streaming device includes:
detecting, by the one or more sensors, the line-of-sight signal emitted by the second streaming device, wherein the one or more sensors on the electronic device are arranged to (i) detect the line-of-sight signal when the one or more sensors are oriented toward the second streaming device and are located within a path of the line-of-sight signal, and (ii) disable detection of the line-of-sight signal when the one or more sensors are oriented away from the second streaming device or are located outside of the path of the line-of-sight signal; and
determining, by the electronic device and based on information encoded in the line-of-sight signal, an identifier of the second streaming device.

7. The method of claim 6, wherein:
the line-of-sight signal emitted by the second streaming device comprises an infrared data signal; and
the one or more sensors on the electronic device comprise one or more infrared sensors.

8. The method of claim 1, wherein the electronic device includes (i) one or more infrared lights that comprise an infrared illuminator and (ii) an infrared camera, and detecting the input signals identifying the second streaming device further includes:
activating the one or more infrared lights to illuminate a region in front of the infrared camera of the electronic device; and
identifying the second streaming device from an image of at least a portion of the second streaming device that was captured by the infrared camera while the one or more infrared lights are activated, the input signals including the image of the portion of the second streaming device.

9. The method of claim 8, wherein the image of the at least the portion of the second streaming device comprises a reflection of a retroreflective component affixed to the second streaming device, the retroreflective component including an identifier for the second streaming device.

10. The method of claim 1, wherein:
the one or more sensors on the electronic device comprise a first microphone at a first location on the electronic device and a second microphone at a second location on the electronic device, the second location being separated by a non-zero distance from the first location;
the input signals include an audio signal generated by the second streaming device; and
detecting the input signals identifying the second streaming device comprises:
detecting, with the first microphone, the audio signal generated by the second streaming device;
detecting, with the second microphone, the audio signal generated by the second streaming device;
comparing the audio signal as detected with the first microphone and the audio signal as detected with the second microphone; and
determining, based on a result of the comparing, whether the second streaming device is located in a central region in front of the first microphone and the second microphone, such that the first microphone and the second microphone are oriented toward the second streaming device.

11. An electronic device, comprising:
one or more processors,
one or more sensors;
one or more speakers; and
memory having instructions stored thereon, which when executed by the one or more processors cause the processors to perform operations comprising:
receiving a first stream of audio data from a first streaming device and playing the first stream of audio data via the one or more speakers, wherein the electronic device is coupled to the first stream of audio data via a first wireless data connection;
while playing the first stream of audio data:

detecting a user input requesting the electronic device that is currently coupled to the first streaming device to establish a second wireless data connection with a second streaming device that is distinct from the first streaming device; and detecting based on a changed orientation of the one or more sensors towards a second streaming device input signals identifying the second streaming device;

in response to detection of the user input and the input signals, establishing the second wireless data connection between the electronic device and the second streaming device;

receiving a second stream of audio data from the second streaming device over the second wireless data connection; and causing audio encoded in the second stream of audio data to be played through the one or more speakers of the electronic device.

12. The electronic device of claim 11, wherein:

the one or more sensors on the electronic device include a directional microphone that is sensitive to audio emitted from a location in front of at least a portion of the electronic device, but that is substantially insensitive to audio emitted from locations other than the location in front of the at least the portion of the electronic device;

the input signals include an audio signal; and detecting the input signals identifying the second streaming device comprises detecting the audio signal, with the directional microphone, that has been emitted by the second streaming device.

13. The electronic device of claim 11, wherein the second wireless data connection comprises a BLUETOOTH connection.

14. The electronic device of claim 11, wherein the electronic device comprises wireless headphones, the wireless headphones including the one or more speakers and a wireless communications interface for establishing the first and second wireless data connection with the first and second streaming devices, respectively.

15. The electronic device of claim 11, wherein detecting the user input comprises identifying that a control located on the electronic device has been selected by the user input.

16. A non-transitory computer-readable medium having instructions stored thereon, which when executed by one or more processors cause the processors to perform operations comprising:

at an electronic device having one or more sensors and one or more speakers:

receiving a first stream of audio data from a first streaming device and playing the first stream of audio data via the one or more speakers, wherein the electronic device is coupled to the first stream of audio data via a first wireless data connection;

while playing the first stream of audio data:

detecting a user input requesting the electronic device that is currently coupled to the first streaming device to establish a second wireless data connection with a second streaming device that is distinct from the first streaming device; and detecting based on a changed orientation of the one or more sensors towards a second streaming device input signals identifying the second streaming device;

in response to detection of the user input and the input signals, establishing the second wireless data connection between the electronic device and the second streaming device;

receiving a second stream of audio data from the second streaming device over the second wireless data connection; and causing audio encoded in the second stream of audio data to be played through the one or more speakers of the electronic device.

17. The non-transitory computer-readable medium of claim 16, further comprising:

in response to detection of the user input and the input signals, terminating the first wireless data connection between the electronic device and the first streaming device.

18. The non-transitory computer-readable medium of claim 16, wherein each of the first and second streaming devices is selected from among one of a smartphone, a tablet computer, a notebook computer, a smartwatch, a gaming console, a desktop computer, and a streaming music console.

19. The non-transitory computer-readable medium of claim 16, wherein the second wireless data connection is established between the electronic device and the second streaming device concurrently with the first wireless data connection established between the electronic device and the first streaming device, and the second stream of audio data is played through the one or more speakers of the electronic device concurrently with the first stream of audio data.

20. The non-transitory computer-readable medium of claim 16 having instructions stored thereon for:

in response to establishing the second wireless data connection between the electronic device and the second streaming device, generating at least one of visual feedback and aural feedback with the electronic device to indicate to a user of the electronic device that the second wireless data connection has been established.

* * * * *